US011396383B2

(12) United States Patent
 Kim

(10) Patent No.: US 11,396,383 B2
(45) Date of Patent: Jul. 26, 2022

(54) UNMANNED PACKAGE STORAGE SYSTEM FOR DRONE PACKAGE DELIVERY AND SYSTEM THEREOF

(71) Applicant: Kwan Doo Kim, Paju-si (KR)

(72) Inventor: Kwan Doo Kim, Paju-si (KR)

( * ) Notice: Subject to any disclaimer, the term of this patent is extended or adjusted under 35 U.S.C. 154(b) by 246 days.

(21) Appl. No.: 16/132,744

(22) Filed: Sep. 17, 2018

(65) Prior Publication Data

US 2020/0407079 A1    Dec. 31, 2020

(51) Int. Cl.
| | |
|---|---|
| *B64F 1/32* | (2006.01) |
| *B64C 39/02* | (2006.01) |
| *B64D 1/02* | (2006.01) |
| *H02J 7/02* | (2016.01) |
| *H02J 50/90* | (2016.01) |
| *H02J 7/35* | (2006.01) |
| *B64F 1/36* | (2017.01) |
| *H04W 4/80* | (2018.01) |
| *H04W 4/40* | (2018.01) |

(52) U.S. Cl.
 CPC .............. *B64F 1/32* (2013.01); *B64C 39/024* (2013.01); *B64D 1/02* (2013.01); *B64F 1/362* (2013.01); *H02J 7/02* (2013.01); *H02J 7/35* (2013.01); *H02J 50/90* (2016.02); *H04W 4/40* (2018.02); *H04W 4/80* (2018.02); *B64C 2201/027* (2013.01); *B64C 2201/128* (2013.01)

(58) Field of Classification Search
 CPC .............. B64F 1/32; B64C 39/02; B64D 1/02
 USPC ......................................................... 198/750.2
 See application file for complete search history.

(56) References Cited

U.S. PATENT DOCUMENTS

| | | | |
|---|---|---|---|
| 10,377,507 B2* | 8/2019 | Tremblay | G08G 5/0026 |
| 10,410,105 B1* | 9/2019 | Stoman | B65D 51/24 |
| 10,501,205 B1* | 12/2019 | Siewert | B64F 1/32 |
| 10,703,507 B2* | 7/2020 | Comerford | B64C 39/024 |
| 10,899,449 B2* | 1/2021 | Luckay | G05D 1/0676 |
| 10,946,982 B2* | 3/2021 | Carthew | B64D 1/12 |
| 10,993,569 B2* | 5/2021 | Gil | B64F 1/32 |
| 11,027,843 B2* | 6/2021 | Prager | G05D 1/101 |
| 11,066,186 B2* | 7/2021 | Walsh | A47G 29/141 |
| 2015/0158599 A1* | 6/2015 | Sisko | |
| 2015/0175276 A1* | 6/2015 | Koster | |
| 2017/0091710 A1* | 3/2017 | Van Dyke | |
| 2019/0019141 A1* | 1/2019 | Torii et al. | |
| 2019/0133363 A1* | 5/2019 | Burchat | |
| 2021/0114729 A1* | 4/2021 | Ragan et al. | |
| 2021/0394930 A1* | 12/2021 | O'Toole | |

\* cited by examiner

*Primary Examiner* — Douglas A Hess
(74) *Attorney, Agent, or Firm* — LRK Patent Law Firm

(57) ABSTRACT

An unmanned article storage box for automatically receiving an article from a drone and storing the article includes: a box main body configured to form an accommodating space for storing the article therein; an article receiver configured to slidingly be carried in and out from the box main body; a sliding unit configured to slidingly move the article receiver by having a first end that is fastened to the article receiver and a second end that is fastened to an inside of the box main body; a power unit configured to transfer a power to enable the article receiver to move along the sliding unit; and a controller configured to control the power unit.

17 Claims, 24 Drawing Sheets

(a)

(b)

(a)                              (b)

FIG. 15
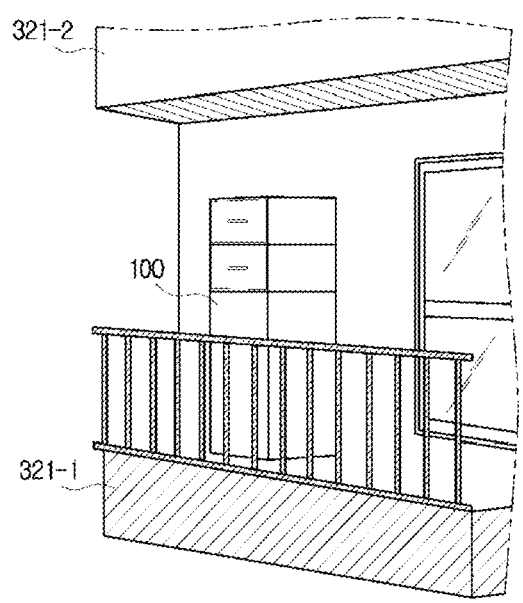
(a)
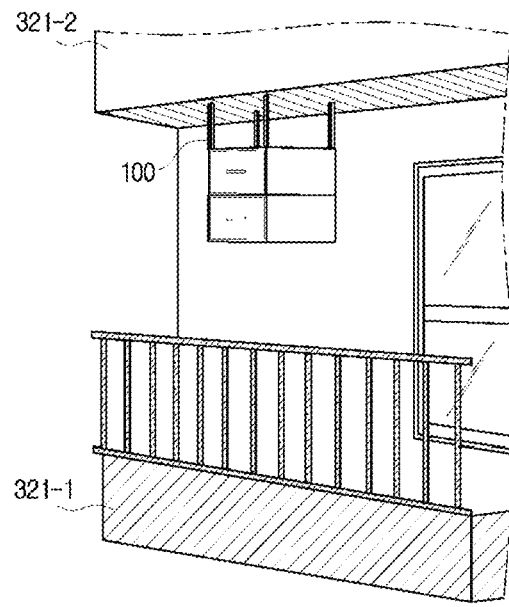
(b)
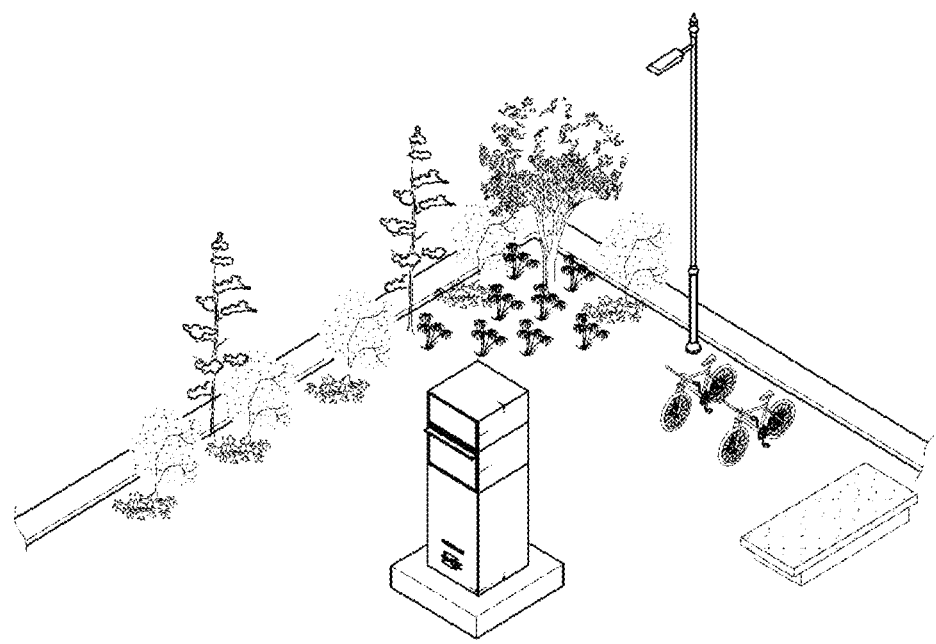
(c)

UNMANNED PACKAGE STORAGE SYSTEM FOR DRONE PACKAGE DELIVERY AND SYSTEM THEREOF

BACKGROUND OF THE INVENTION

1. Field of the Invention

The present invention relates to an unmanned delivery box capable of receiving articles in an unmanned manner when delivery service such as article delivery is performed by using drone and capable of reducing delivery time and cost of a delivery man who performs the article delivery through a vehicle by being installed in a wild area, a remote area, or the like.

2. Description of Related Art

With the recent commercialization of drone (unmanned aerial vehicle), drones have been used in various fields such as camera shooting. Particularly, as the electronic commerce becomes popular, the drones have been used to deliver articles, and thus have received great response from related industries.

In the case of heavy or bulky items, it is inevitable to utilize conventional transportation means. However, in the case of small-sized and small-volume items, it is possible to increase work efficiency by using drone instead of conventional transportation equipment and manpower.

However, in recent years, when a drone is used as a means of delivering an article, it is troublesome that a recipient who is scheduled to receive the article must directly receive the article delivered by the drone. This is because it is not allowed to leave the article near the recipient's place in the absence of the recipient. It is difficult to deliver articles in common buildings such as apartment buildings due to their structures, and there are many concerns about loss or theft in a residential area without a fence. In addition, there is a very high risk of being damaged due to being wet or windy when the articles are left in place.

Recently, an unmanned delivery-service box is increasingly installed in the case that no recipient exists when articles are delivered by manpower. However, since this conventional unmanned delivery-service box has been developed on the assumption that a person delivers an article, it is difficult to use it for drone delivery.

When an article is drone-delivered by using the conventional unmanned delivery-service box as it is, theft incident may occur due to an unmanned operation, and it may be required to have various delivery box structures in accordance with a variety of design environments such as an open cross-section of the opening and an installment area of the delivery box and an article is delivered from the sky above the delivery box may be damaged, thereby causing compensation for the damage.

Therefore, a study on an unmanned delivery-service box that can be used by a drone has been required in consideration of various problems described above that may occur in accordance with the spread of drone delivery service.

The above information disclosed in this Background section is only for enhancement of understanding of the background of the invention and therefore it may contain information that does not form the prior art that is already known in this country to a person of ordinary skill in the art.

SUMMARY OF THE INVENTION

An object of the present invention is to solve the aforementioned problems and other problems. Another object is to provide an environment in which problems that may occur when an article is received in an unmanned manner by a drone are removed.

Technical objects desired to be achieved in the present invention are not limited to the aforementioned objects, and other technical objects not described above will be apparent to those skilled in the art from the disclosure of the present invention.

For achieving the objects or other objects, an aspect of the present invention provides an unmanned article storage box including: a box main body configured to form an accommodating space for storing the article therein; an article receiver configured to slidingly be carried in and out from the box main body; a sliding unit configured to slidingly move the article receiver by having a first end that is fastened to the article receiver and a second end that is fastened to an inside of the box main body; a power unit configured to transfer a power to enable the article receiver to move along the sliding unit; and a controller configured to control the power unit.

The unmanned article storage box may further include a wireless communication unit configured to transmit and receive data to and from the drone.

In this case, the controller may control the power unit to carry the article receiver out along the sliding unit when a receiver-carrying-out control command is received from the drone through the wireless communication unit. The controller may control the power unit to enable the article receiver to be carried in along the sliding unit when a receiver-carrying-in control command is received from the drone through the wireless communication unit after the drone puts the article in the article receiver.

The article receiver may include a windshield panel provided to surround the article receiver, and the article receiver may include an article-recept plate that is vertically moved up and down on the sliding unit.

The unmanned article storage box may further include a pad (impact-absorption pad) provided at an upper end of the article-recept plate. The pad may be made of a material having elasticity, such as rubber, to prevent the drone from impacted even when the drone is abnormally landed due to wind or the like.

A drain line may be formed on the article-recept plate itself or the pad attached on an upper surface thereof in a predetermined pattern by a predetermined depth to be drained.

In addition, a plurality of drain holes may be formed on the drain line in the article-recept plate.

The article-recept plate may include a field generator for generating a magnetic field at a predetermined region on the article-recept plate.

The article-recept plate may include a wireless charger for wirelessly transmitting a power to the drone landed on the article-recept plate.

The wireless charger may be vertically movable up and down together with the article-recept plate.

The unmanned article storage box may further include a solar panel disposed at an upper portion of the unmanned article storage box to be inclined at a predetermined angle; and an energy storage unit configured to store the power generated by the solar panel.

Effects of the unmanned storage box according to exemplary embodiments of the present invention will be described as follows.

According to at least one of the exemplary embodiments of the present invention, articles may be received and stored through a drone without person.

According to at least one of the exemplary embodiments of the present invention, the storage box may be installed on an inner or outer portion of a high-rise building such as an apartment or an office building, to directly deliver an article to a house where a recipient lives.

According to an exemplary embodiment of the present invention, it is possible to provide an article storage box that also serves as a mail box, in an external space (a garden, a yard, a playground, an entrance hall, etc.) of a building such as a single-storied building.

An additional range of applicability of the present invention will become clear from the following detailed description. However, since various modifications and alternations within the spirit and scope of the present invention may be clearly understood by those skilled in the art, it is to be understood that a detailed description and a specific exemplary embodiment of the present invention such as an exemplary embodiment of the present invention are provided only by way of example.

BRIEF DESCRIPTION OF THE DRAWINGS

FIG. 15 illustrates an example in which an article storage box 100 is installed according to an exemplary embodiment of the present invention.

DETAILED DESCRIPTION OF THE EMBODIMENTS

Figure 1A:
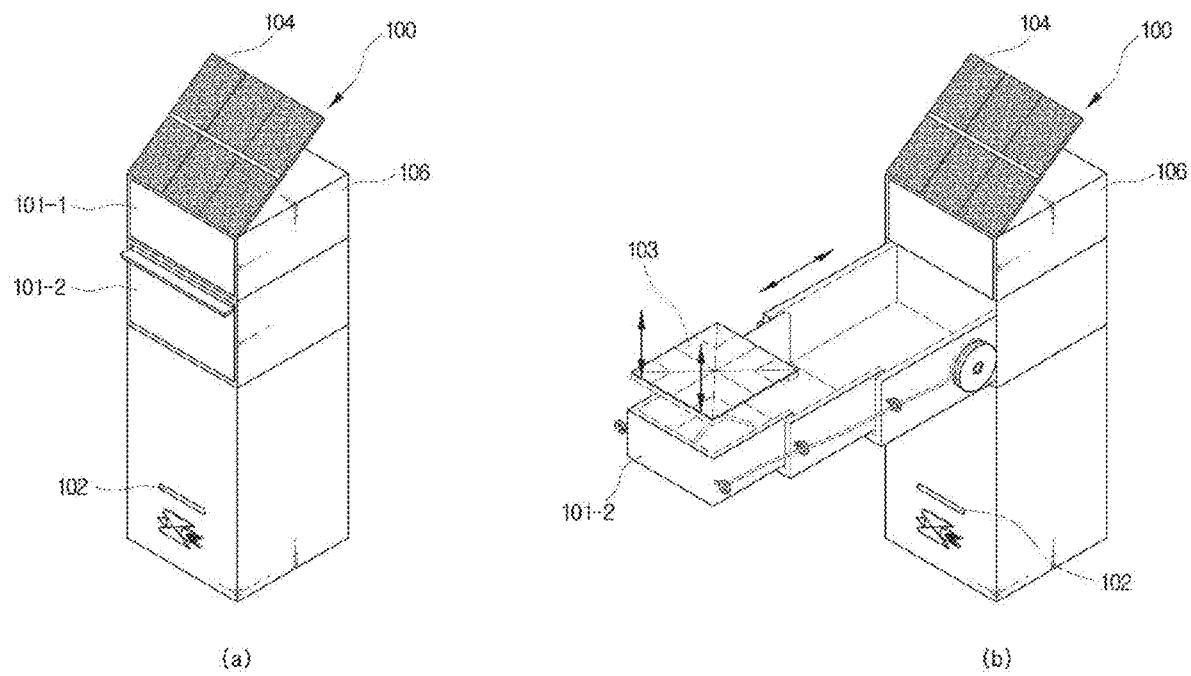
FIG. 1A to FIG. 1B are perspective views illustrating an unmanned article storage box 100 according to an exemplary embodiment of the present invention.

Hereinafter, exemplary embodiments disclosed in the present specification will be described in detail with reference to the accompanying to drawings. In the present specification, the same or similar components will be denoted by the same or similar reference numerals, and a repeated description thereof will be omitted. Terms "module" and "unit" for components used in the following description are used only in order to easily make a specification. Therefore, these terms do not have meanings or roles that distinguish them from each other in themselves. In describing exemplary embodiments of the present specification, when it is determined that a detailed description of the well-known art associated with the present invention may obscure the gist of the present invention, it will be omitted. The accompanying drawings are provided only in order to allow exemplary embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or be connected or coupled to the other component with a further component intervening therebetween. On the other hand, it is to be understood that when one component is referred to as being "connected or coupled directly" to another component, it may be connected to or coupled to the other component without another component intervening therebetween.

Singular forms are to include plural forms unless the context clearly indicates otherwise.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

As described above, the present invention proposes an unmanned article storage box capable of receiving an article delivered through a drone in an unmanned manner and storing the article.

In general, a plurality of propellers are formed at a top portion of the drone, and most of which is used as a region for the propellers in order to be balanced and stable. As a result, when the drone transports an article, it is stable to dispose it on a bottom portion of the drone. In addition, is advantageous for the drone to pick up or drop it by itself. Accordingly, various structures capable of disposing delivery articles at a bottom of the drone have been proposed. For example, a structure is provided to include an arm unit is for picking up an object through a lower portion or a side surface of the drone and a takeoff and landing unit for taking off and landing the drone in a state of stably holding the object through the arm unit.

As described above, the present invention proposes an article storage box and a system therefor, capable of automatically receiving an article delivered by a drone and storing the delivered article on the assumption that an object is disposed at a bottom of the drone as described above.

Figure 1B:
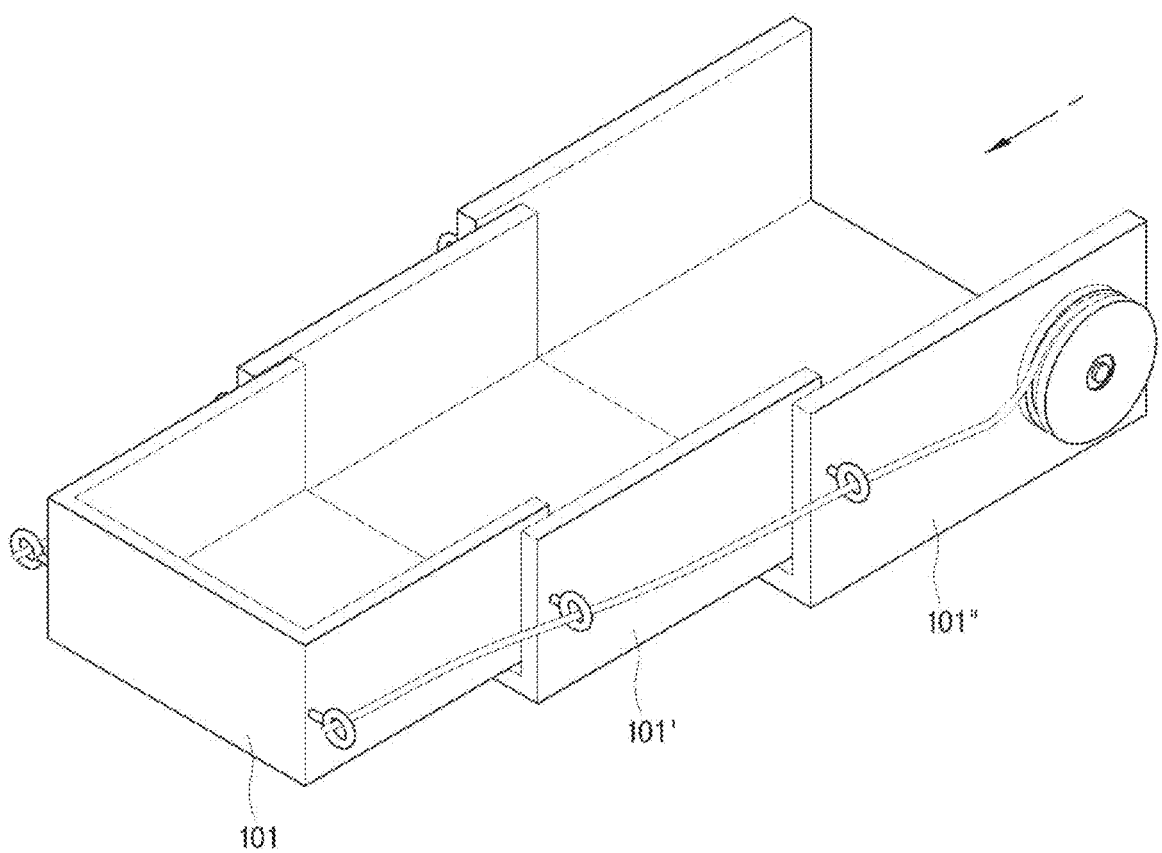
Figure 2:
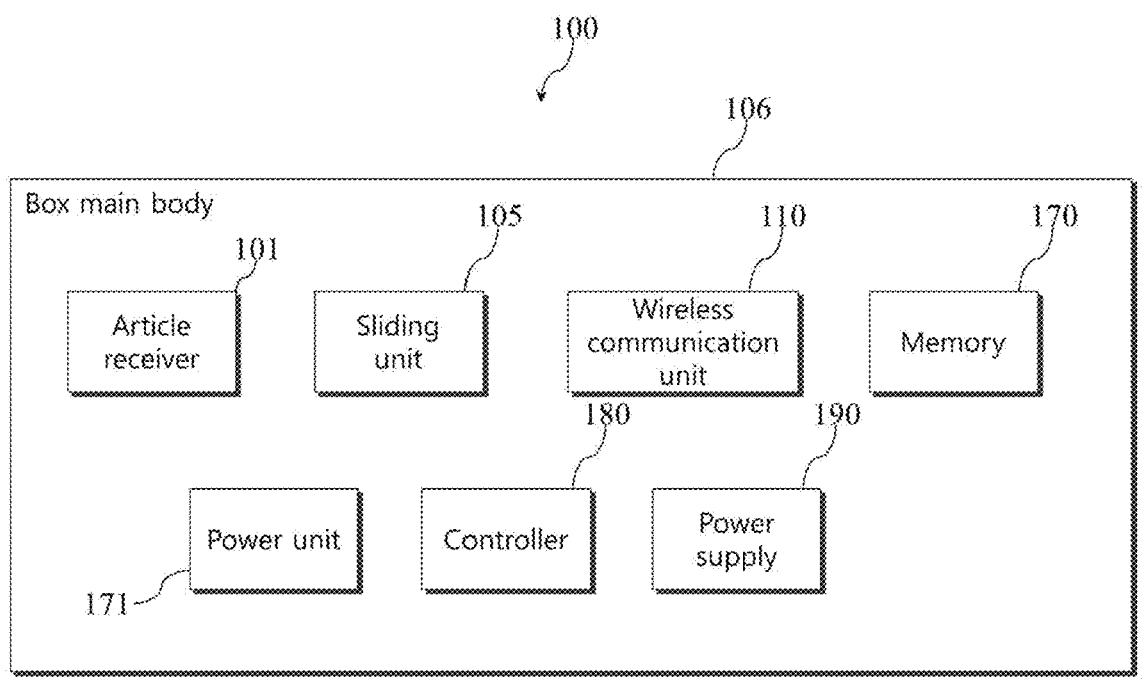
FIG. 2 is a block diagram illustrating an article storage box 100 according to an exemplary embodiment of the present invention.
Figure 3:
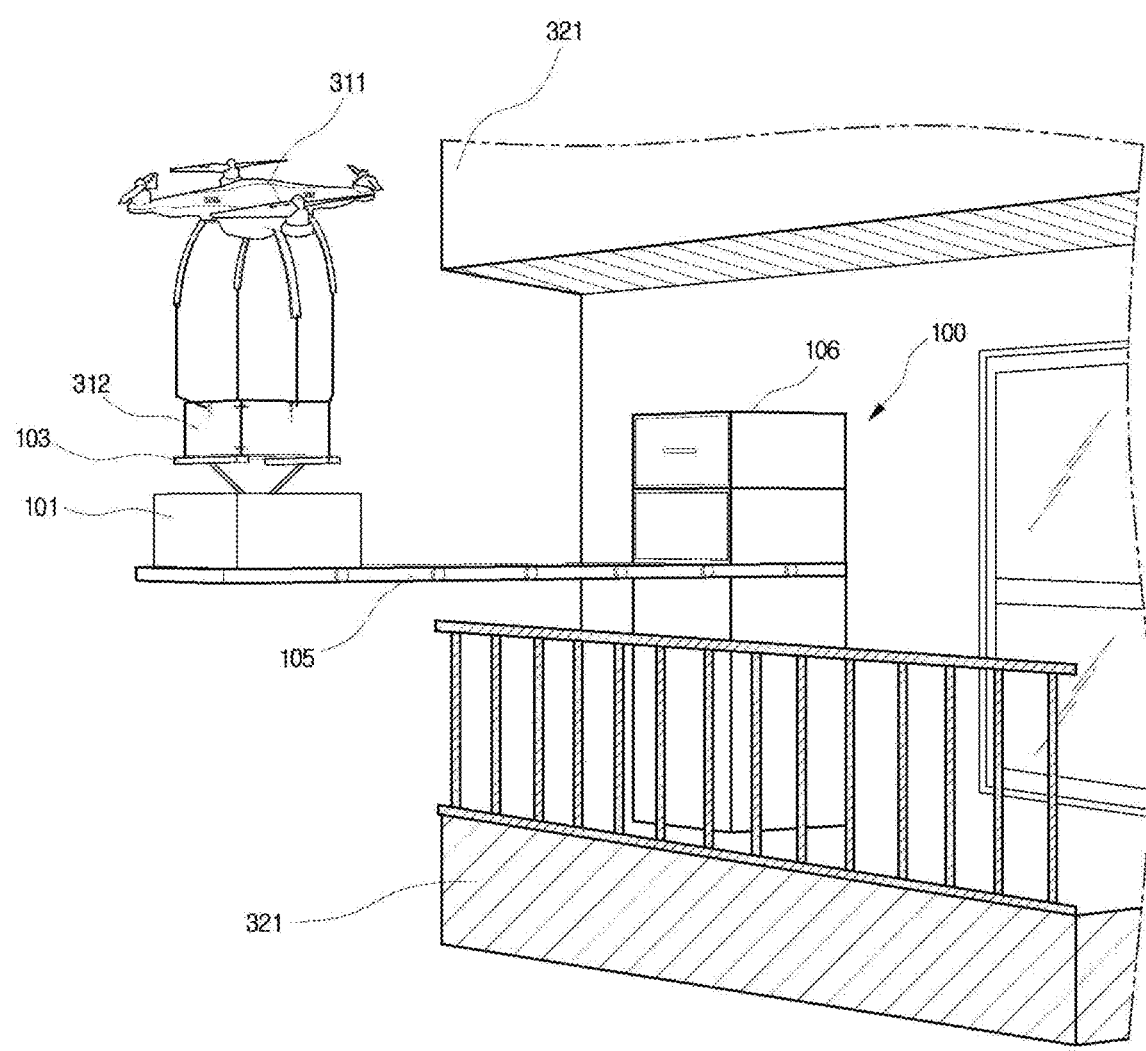
FIG. 3 is a concept view illustrating how a drone 311 delivers an article according to an exemplary embodiment of the present invention.

FIG. 1A to FIG. 1B are perspective views illustrating an unmanned article storage box 100 according to an exemplary embodiment of the present invention. FIG. 2 is a block diagram illustrating an article storage box 100 according to an exemplary embodiment of the present invention. FIG. 3 is a concept view illustrating how a drone 311 delivers an article according to an exemplary embodiment of the present invention. Hereinafter, an exemplary embodiment of the present invention will be described with reference to these drawings.

According to the present exemplary embodiment, the unmanned article storage box 100 may include a box main body 106 configured to form an accommodating space for storing an article therein; an article receiver 101 configured to slidingly be carried in and out from the box main body 106; a sliding unit 105 configured to slidingly move the article receiver 101 by having a first end that is fastened to the article receiver 101 and a second end that is fastened to an inside of the box main body 106; a power unit 171 configured to transfer a power to enable the article receiver 101 to move along the sliding unit 105; and a controller 180 configured to control the power unit 171.

FIG. 1B illustrates a structure of the sliding unit 105 in more detail according to an exemplary embodiment of the present invention. As illustrated therein, the article receiver 101 itself may form a multi-stage drawer structure, and the sliding unit 105 may include a plurality of units 101' and 101" which surround the article receiver 101 in the multi-stage drawer structure. According to the structure as illustrated in FIG. 1B, a ring may be formed in each of the units 101' and 101" constituting the multi-stage, and a wire may be coupled to each ring.

In the present exemplary embodiment, a wire may be coupled to the power unit 171 itself to transfer a power that enables the article receiver 101 to slide. Specifically, using the wire may make it to slide the sliding unit 105 so that the sliding unit 105 is entirely stretched or contracted to carry in or out the article receiver 101 itself.

In addition, when the sliding unit 105 collapes due to an external force (e.g., a drone falls or the weight of the article to be delivered is too low), the wire may serve to hold the article receiver 101 or the sliding unit 105 so as not to fall down.

As a result, the article receiver 101 is slidably carried out to receive an article from the drone 311, and then is carried in like a cabinet drawer, thereby receiving and storing the article stably.

Particularly, the article receiver 101 may include a first article receiver 101-1 and a second article receiver 101-2 formed in different sizes. The present invention is not limited to two receivers, and it shall be obvious that it may include more than two article receivers.

As illustrated in FIG. 3, the unmanned article storage box 100 may be installed in an inner or outer portion 321 of the building, and the article receiver 101 which is slidably carried out may receive the article 312 from the drone 311.

A sliding unit 105 may be provided to carry the article receiver 101 in or out from the box main body 106. In the present exemplary embodiment, the sliding unit 105 proposes a structure for enduring more loads. Hereinafter, this structure will be described in detail with reference to FIG. 4A and FIG. 4B.

Figure 4A:
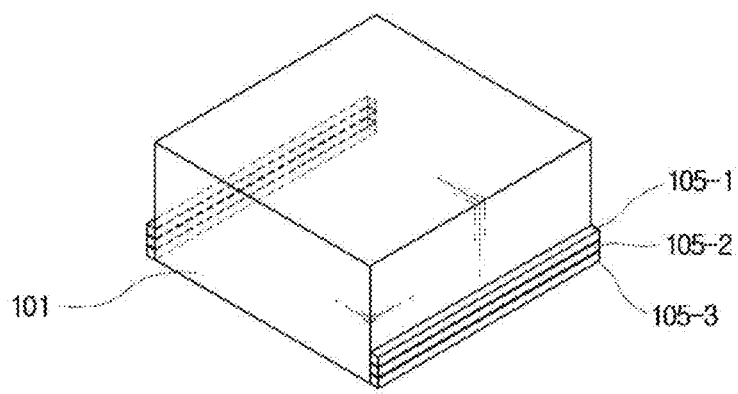
FIG. 4A and FIG. 4B illustrate a multistage structure of a sliding unit 105 according to an exemplary embodiment of the present invention.
Figure 4B:
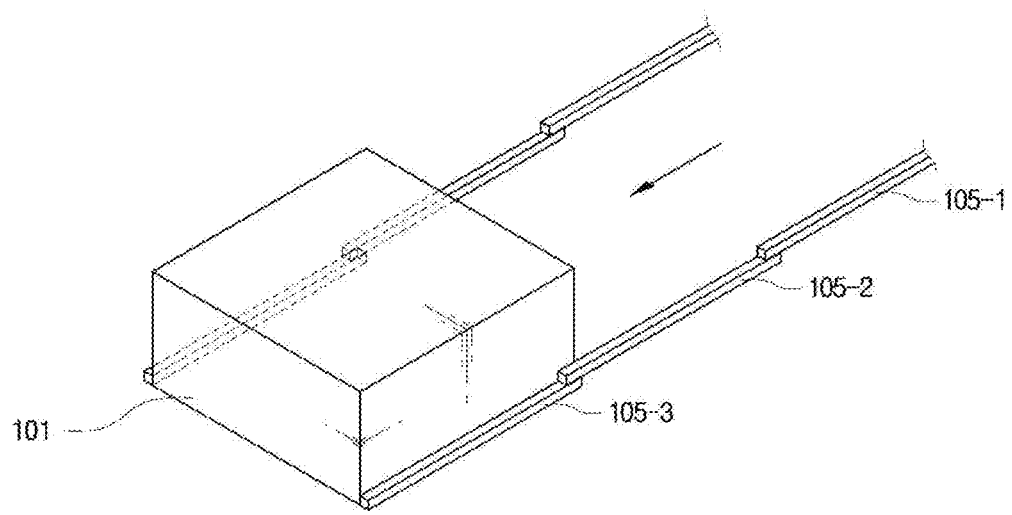
Figure 5:
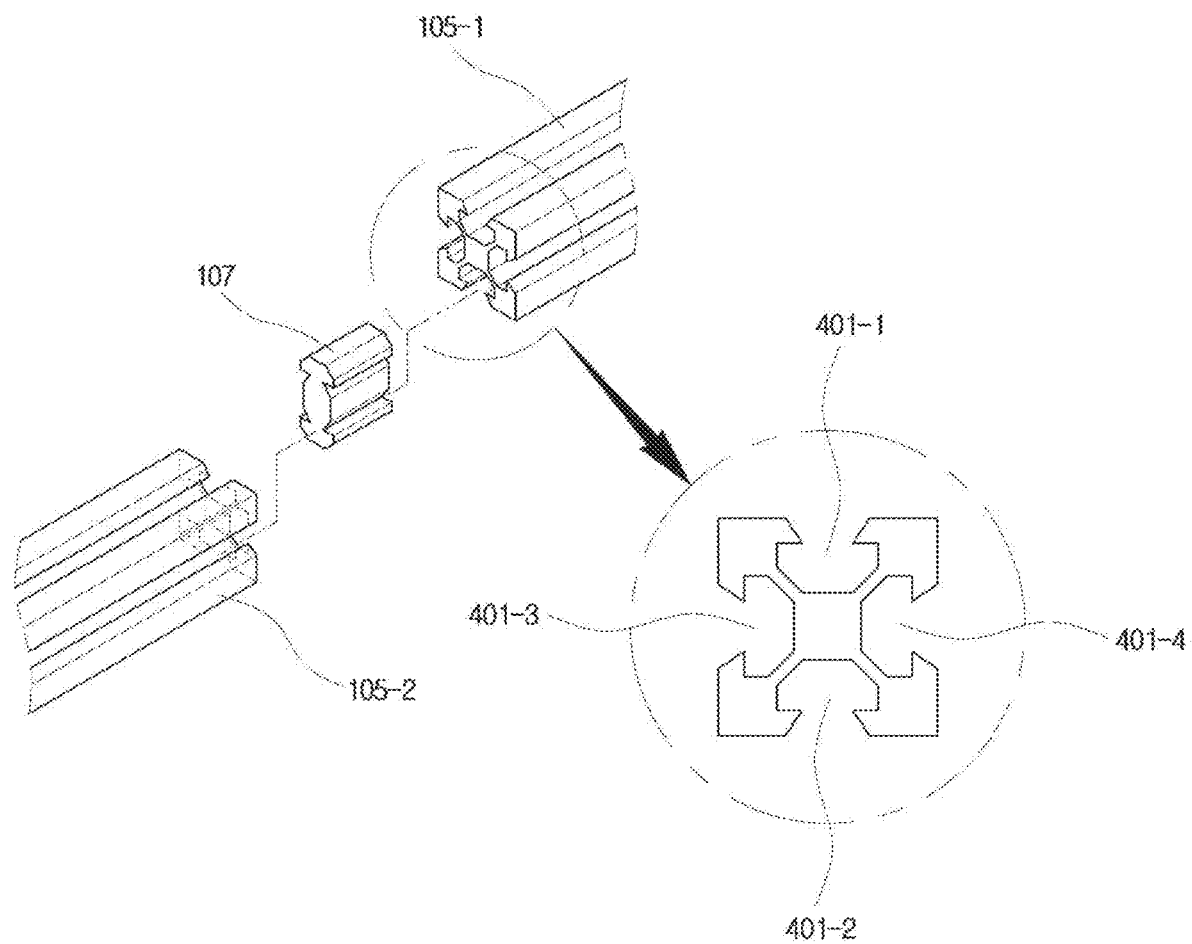
FIG. 5 illustrates a coupling structure between multistage sliding units 105 according to an exemplary embodiment of the present invention.

FIG. 4A and FIG. 4B illustrate a multistage structure of a sliding unit 105 according to an exemplary embodiment of the present invention. FIG. 5 illustrates a coupling structure between multistage sliding units 105 according to an exemplary embodiment of the present invention.

In the present exemplary embodiment, it is further contemplated that not only the unmanned article storage box 100 is installed on the ground but also it is installed in an inner or outer portion of a high-rise building such as an apartment or an office building. This is because, when multiple houses are densely present in such a building, it is necessary to consider the situation in which it is installed in each house.

To be installed in an inner or outer portion of a high-rise building, there is a need for the article receiver to be slidably moved over a considerable distance. This is because a wind intensity in high altitudes as in high-rise buildings is higher than in the ground, and the drone 311 is a device that is highly influenced by wind strength. In other words, when the drone 311 deviates from a normal position for a while due to influence of the wind, there is a risk of collision with the inner or outer portion of the building.

Accordingly, in the present exemplary embodiment, it is proposed that the sliding unit 105 is provided not in a simple rail but in multiple stages.

Referring to FIG. 4A and FIG. 4B, a multi-stage sliding unit 105 including 3 stages is provided on a side surface of the article receiver 101, and the stages may be provided as a plurality of rails. Being provided in three stages is merely an example, and it shall be obvious that it may be provided in two or more stages.

FIG. 4A illustrates a plurality of rails constituting the multi-stage sliding units 105-1 to 105-3 in a state where the article receiver 101 is inserted into the box main body 106. Some of the rails constituting the multi-stage sliding units 105-1 to 105-3 are folded.

The rails constituting the multi-stage sliding units 105-1 to 105-3 are fastened to each other so as to be slidable with respect to each other. FIG. 5 illustrates an exemplary embodiment of the present invention in which the first rail 105-1 and the second rail 105-2 are fastened by a coupling protrusion 107. The first and second rails 105-1 and 105-2 may include a plurality of grooves 401-1 to 401-4 in a rail length direction. A first end of the coupling protrusion 107 may be coupled to one of the grooves 401-1 to 401-4 of the first rail 105-1, and a second end thereof may be coupled to one of the grooves 401-1 to 401-4 of the second rail 105-2, for slidable movement. The coupling protrusion 107 may have a protrusion shape corresponding to the grooves 401-1 to 401-4 to be coupled to one of the grooves 401-1 to 401-4. The shape of the grooves 401-1 to 401-4 is formed such that the coupled protrusion is slidable without escaping by forming widths of the grooves near the entrance of the grooves to be smaller than widths of the grooves constituting a space therein.

When an article is received in the article receiver 101 which is slidably moved to a remote position, even if the article is light-weighted, the load felt by the sliding unit 105 may be significant.

Accordingly, in the present exemplary embodiment, it is proposed to provide both side sliding units 105-1 to 105-3 provided in a side surface of the article receiver 101 and bottom sliding units 105-4 to 105-6 provided in a bottom thereof.

Figure 6:
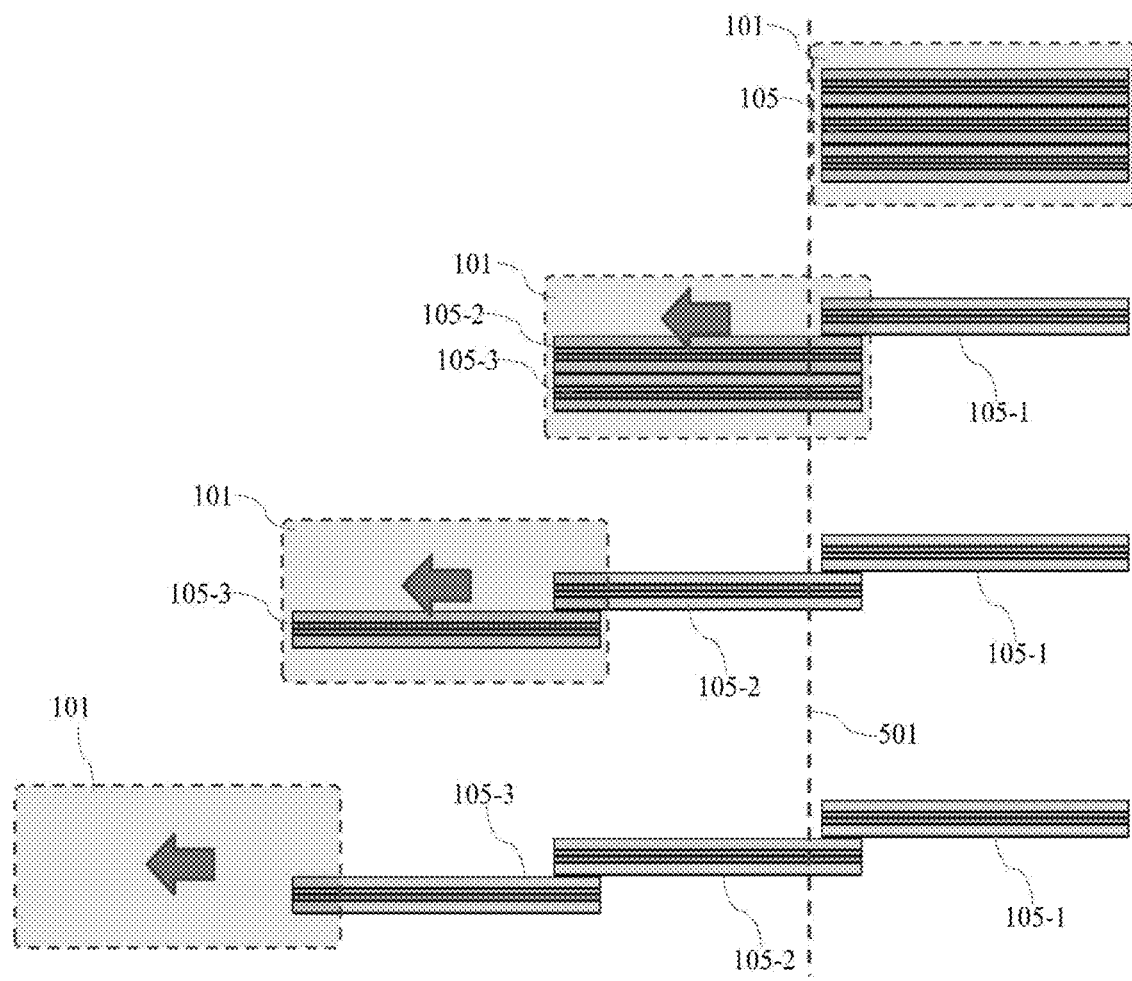
FIG. 6 is a concept view illustrating how side sliding units 105-1 to 105-3 are expanded according to an exemplary embodiment of the present invention.
Figure 7:
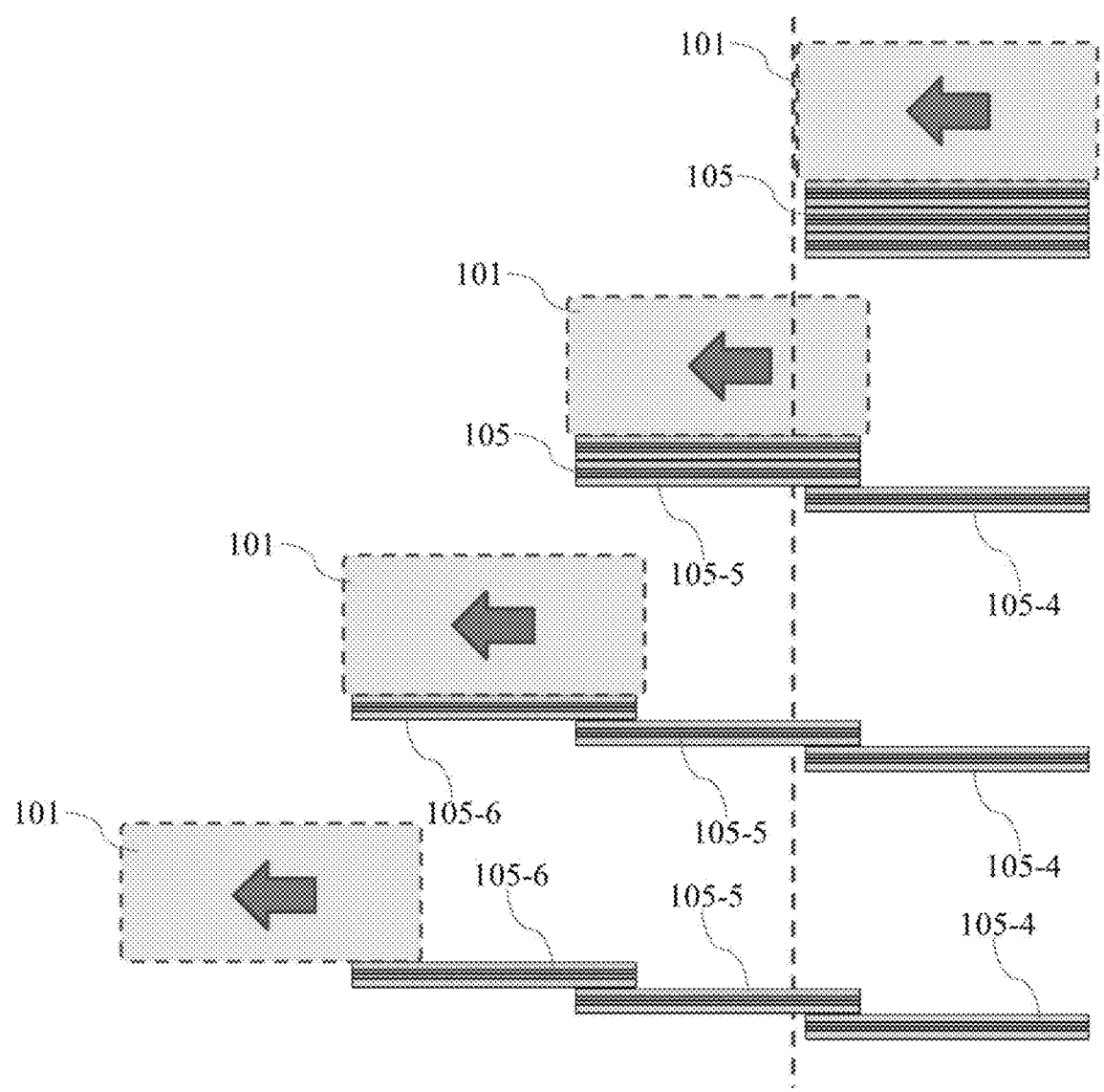
FIG. 7 is a concept view illustrating how bottom sliding units 105-4 to 105-6 are expanded according to an exemplary embodiment of the present invention.

FIG. 6 is a concept view illustrating how side sliding units 105-1 to 105-3 are expanded according to an exemplary embodiment of the present invention. FIG. 7 is a concept view illustrating how bottom sliding units 105-4 to 105-6 are expanded according to an exemplary embodiment of the present invention.

Referring to FIG. 6 and FIG. 7, the sliding units are gradually expanded from the top, and a vertical dotted line 501 indicates the boundary of a box main body 106. As illustrated therein, rails 105-1 to 105-6 constituting the multi-stage sliding units 105-1 to 105-6 may be gradually expanded to slidably move the article receiver 101 to a long distance, and may include the side sliding units 105-1 to 105-3 and the bottom sliding units 105-4 to 105-6 together to facilitate more stable sliding movement.

The remaining configuration will be described with reference to FIG. 1A to FIG. 2.

In an exemplary embodiment of the present invention, it may also serve as a mail box for receiving general mails in addition to articles delivered by the drone 311. Therefore, in an exemplary embodiment of the present invention, a mail-receiving groove 102 for receiving mails may be provided, and a space for mails may be further provided in an accommodating space inside the box main body 106.

In addition, the memory 170 stores data supporting various functions of the unmanned article storage box 100. The memory 170 may store a plurality of application programs that are driven in the unmanned article storage box 100, data for operations of the unmanned article storage box 100, and commands. The application programs may be stored in the memory 170 and installed on the unmanned article storage box 100, and may be driven by a controller 180 to execute the operations (or functions) of the unmanned article storage box 100.

The controller 180 may typically control general operations of the unmanned article storage box 100 in addition to the application programs. The controller 180 may provide process appropriate information or functions to users by processing signals, data, and information inputted or outputted through the aforementioned constituent elements or driving the application programs stored in the memory 170.

In addition, the controller 180 may control at least some of the constituent elements described with reference to FIG. 3 in order to drive the application programs stored in the memory 170. Furthermore, the controller 180 may operate a combination of at least two of the constituent elements included in the unmanned article storage box 100.

The power supply 190 receives an external or internal power and supplies it to each of the constituent elements included in the unmanned article storage box 100, under the control of the controller 180. The power supply 190 may include a battery, and the battery may be an internal battery or a replaceable battery.

In the exemplary embodiment of the present invention, a solar panel 104 is proposed as an example of the power supply 190. This is because it is common that most of the electric power is used only at a specific time (e.g., a time when the article is received), and only a standby power is consumed during the remaining time, because of a characteristic of the unmanned article storage box 100. In addition, this is to minimize a management factor by people since it should be operated in an unmanned manner. The solar panel 104 may be used in combination with a battery. For example, a power generated in the solar panel 104 may be stored in the battery during a daytime during which a power can be produced well from the sun, and the operation of the unmanned article storage box 100 may be performed using the power stored in the battery.

At least some of the constituent elements may operate in cooperation with each other to implement an operation, control, or a control method of the unmanned article storage box 100 according to various exemplary embodiments described below. In addition, the operation, the control, or the control method of the unmanned article storage box 100 may be implemented on the unmanned article storage box 100 by driving at least one application program stored in the memory 170.

The wireless communication unit 110 may include at least one module that enables wireless communication between the unmanned article storage box 100 and the drone 311. In the present exemplary embodiment, the wireless communication unit 110, which is for short range communication, may support short range communication by using at least one of Bluetooth™, radio frequency identification (RFID), infrared data association (IrDA), ultra wideband (UWB), ZigBee, near field communication (NFC), wireless-fidelity (Wi-Fi), Wi-Fi direct, and wireless universal serial bus (wireless USB). The wireless communication unit 110 may support wireless communication between networks positioned between the drone 311 and the unmanned article storage box 100. The wireless local area networks may be wireless personal are networks.

The power unit 171 may supply a power that enables the article receiver 101 to be carried in or out on the sliding unit 105. The power unit 171 may be provided in the form of a motor to use a method of converting a turning to power into a linear power on the sliding unit 105, or may be provided to use a method of supplying a linear power itself like a cylinder.

Figure 8:
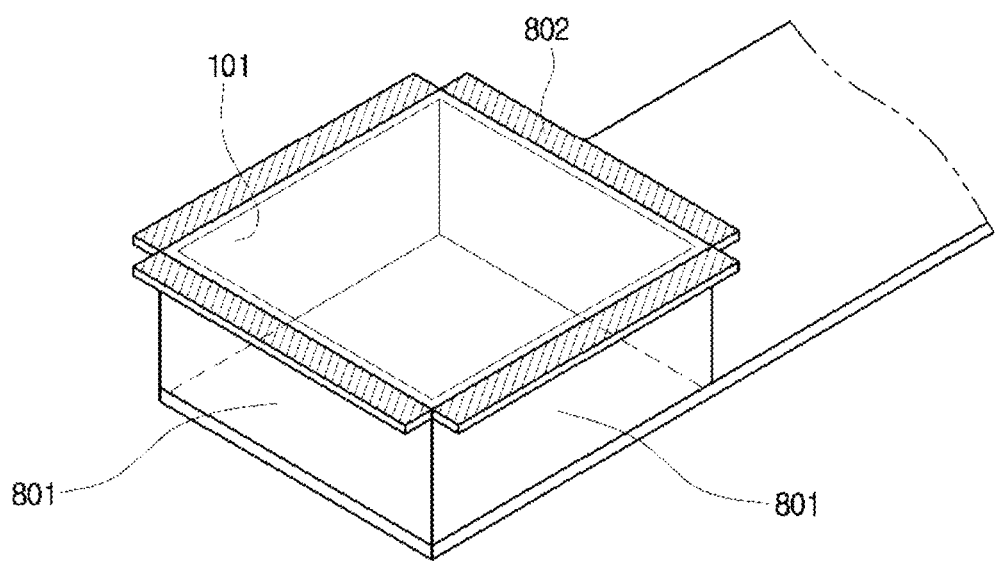
FIG. 8 is a perspective view illustrating an article receiver 101 according to an exemplary embodiment of the present invention.

FIG. 8 is a perspective view illustrating an article receiver 101 according to an exemplary embodiment of the present invention.

The article receiver 101 may be provided in a hexahedral shape having an open top portion. A windshield panel 801 may be provided in at least one of four side surfaces thereof to have such a shape as to surround the article receiver. Since the high-rise building has a lot of wind, the windshield panel 801 needs to be provided in order for drones to take off and land stably. Accordingly, in the present exemplary embodiment, it is proposed to provide the windshield panel 801 that forms at least one side surface of the article receiver 101.

The windshield panel 801 may be formed separately from the article receiver 101, but may be formed integrally with the article receiver 101 so as to have the hexahedral shape described above.

Furthermore, in an exemplary embodiment of the present invention, it is proposed to further include an auxiliary supporter 802 that protrudes outwardly of the article receiver 101. This is because, the article receiver 101 may be formed to have a size corresponding to the size of the general drone 311, but a drone for delivering a large article may have a large shape to fit the large article. For example, the article may be inserted into the article receiver 101, but it may be assumed that the side of the drone 311 itself does not match the article receiver.

Accordingly, in an exemplary embodiment of the present invention, the auxiliary supporter 802 may be further provided to allow the drone, which is difficult to be stably put on the article-recept plate 103 disposed in the article receiver 101 due to a relatively large size thereof, to be stably put thereon.

Figure 9:
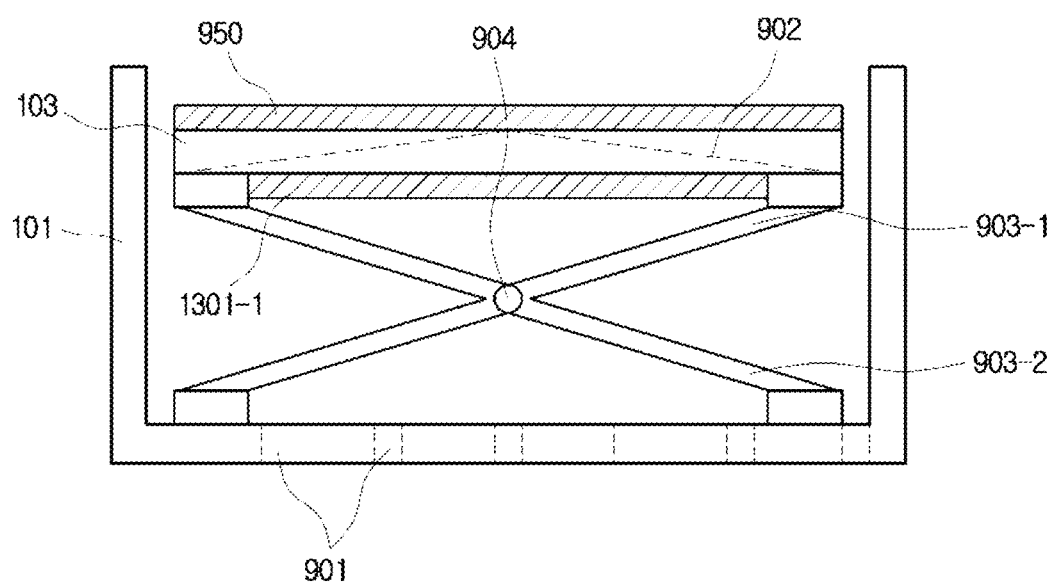
FIG. 9 is a cross-sectional side view for describing a structure of a drain line and a vertical movement structure of an article-recept plate 103 that is vertically movable from a bottom surface of the article receiver 101 according to an exemplary embodiment of the present invention.
Figure 10:
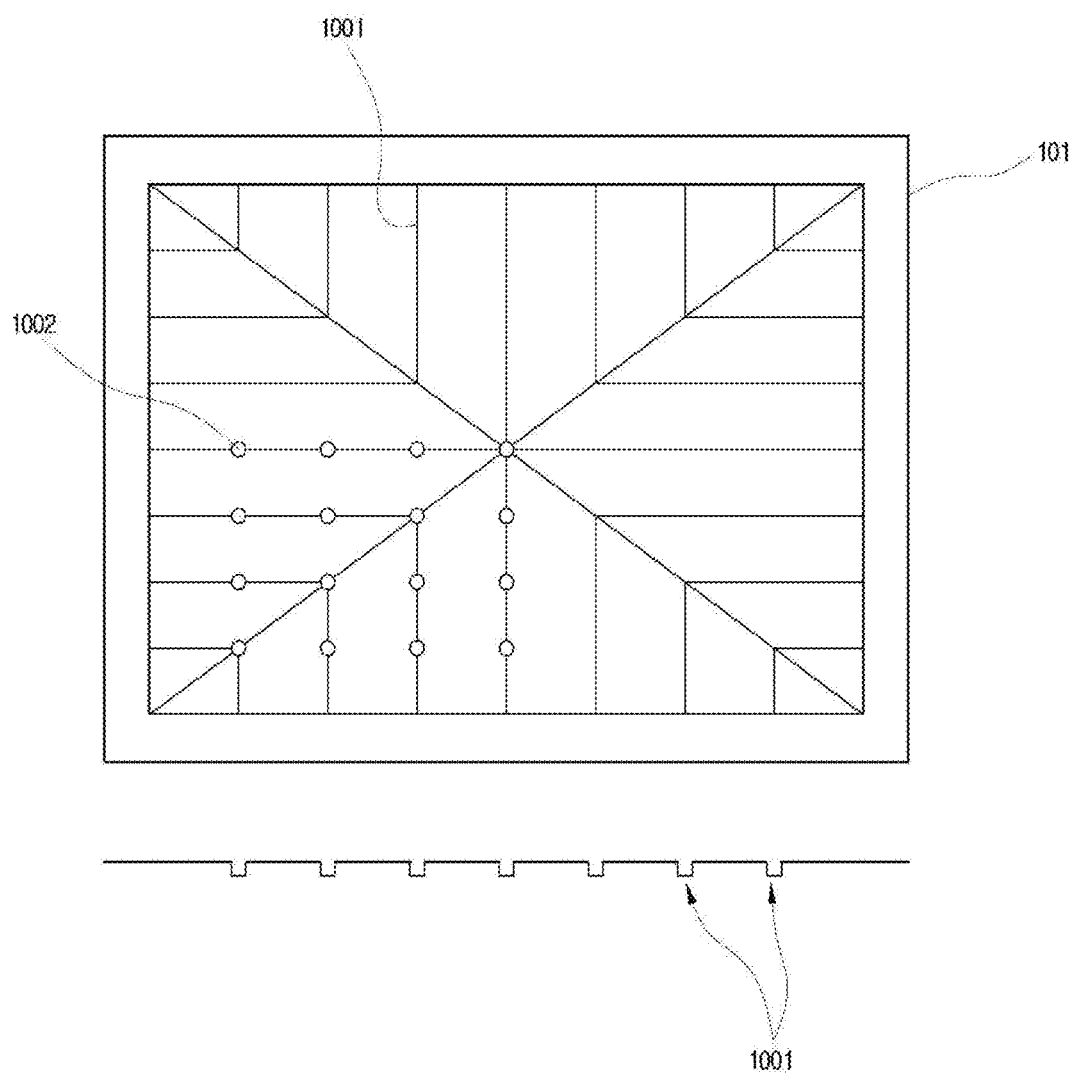
FIG. 10 is a top plan view illustrating a pattern of a drain line formed in the article-recept plate 103 according to an exemplary embodiment of the present invention.

In addition, in an exemplary embodiment of the present invention, an article-recept plate 103 that is vertically movable on the sliding unit 105 may be provided in the bottom surface of the article receiver 101. A structure of the article-recept plate 103 and a drain line formed in the article-recept plate 103 will be described with reference to FIG. 9 and FIG. 10 together FIG. 9 is a cross-sectional side view for describing a structure of a drain line and a vertical movement structure of an article-recept plate 103 that is vertically movable from a bottom surface of the article receiver 101 according to an exemplary embodiment of the present invention. FIG. 10 is a top plan view illustrating a pattern of a drain line formed in the article-recept plate 103 according to an exemplary embodiment of the present invention.

Referring to the illustrated drawings, the article-recept plate 103 may be supported by at least two support legs 903-1 and 903-2, and the two support legs 903-1 and 903-2 can be formed to be rotatable through a hinge-joint 904 at the center. As the two support legs 903-1 and 903-2 are rotated, a slope of the support legs 903-1 and 903-2 may be changed, and the article-recept plate 103 may be vertically moved by the support legs 903-1 and 903-2 whose scope is changed A pad 950 may be provided at an upper end of the article-recept plate 103 to alleviate an impact generated when the drone 311 is landed. The pad 950 may be made of a material having elasticity, such as rubber, to prevent the drone 311 from impacted even when the drone 311 is abnormally landed due to wind or the like.

In the exemplary embodiment of the present invention, a drain line may be formed on the article-recept plate 103 and/or the pad 950 in a predetermined pattern by a predetermined depth such that water does not accumulate on the pad.

According to the illustrated drawings, it is illustrated that drain line 1001 is formed on the article-recept plate 103, but this is merely an example. The drain line 1001 may be formed on the pad 950, or may be formed on both the article-recept plate 103 and the pad 950.

In this case, the drain line 1001 may be inclined so as to become deeper from the center of the article-recept plate 103 to the outside. When the drain line 1001 is inclined in this manner, water impregnated into the drain line from the center of the article-recept plate 103 may be easily discharged outward by the inclination.

Furthermore, a plurality of drain holes 901 may be formed at a bottom portion of the article-recept plate 103 to drain water not to accumulate in the article receiver 101 itself in an environment such as when it rains.

Referring to FIG. 10, the drain line 1001 may be formed in a predetermined pattern. A pattern illustrated in FIG. 10 is merely an example, and the present invention is not limited thereto. A drain hole 1002 may be formed along the drain line 1001. As a result, water may be discharged to the lower end of the article-recept plate 103 through the drain hole 1002 formed on the drain line 1001, and then may be discharged to the drain holes 901 of the aforementioned article receiver 101.

In an exemplary embodiment of the present invention, a configuration for stably receiving an article will be proposed below with reference to FIG. 11.

Figure 11:
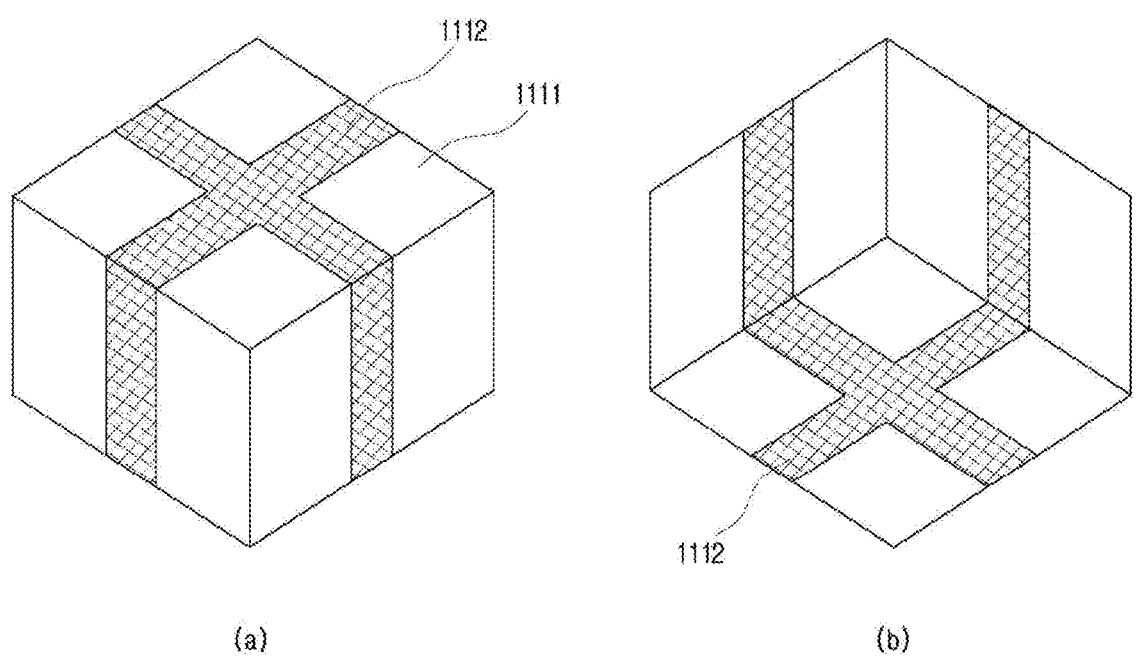
FIG. 11 illustrates an article 312 packaged on at least one lower surface thereof by using a magnetic tape 1112 according to an exemplary embodiment of the present invention.
Figure 12:
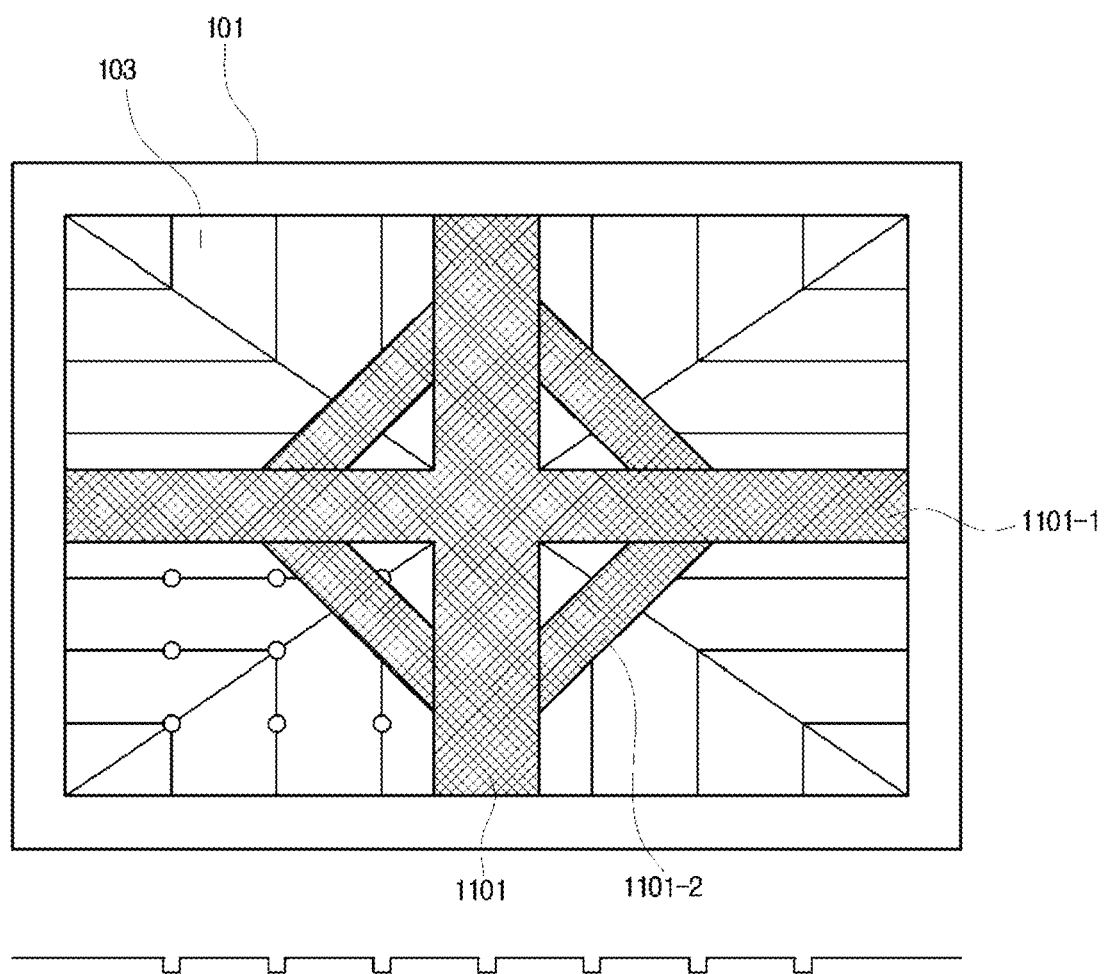
FIG. 12 illustrates a magnetic field generator 1101 provided in the article-recept plate 103 according to an exemplary embodiment of the present invention.

FIG. 11 illustrates an article 312 packaged on at least one lower surface thereof by using a magnetic tape 1112 according to an exemplary embodiment of the present invention. FIG. 12 illustrates a magnetic field generator 1101 provided in the article-recept plate 103 according to an exemplary embodiment of the present invention.

In the present exemplary embodiment, it is assumed that an article to be delivered is packaged using a magnetic tape. The magnetic tape 1112 indicates a tape having a property of a magnetic as well as having a general tape form. Accordingly, a magnetic field may be formed in a surface of the magnetic tape 1112.

In the present exemplary embodiment, it is proposed that a magnetic field is generated in the article-recept plate 103 such that attraction and a magnetic field generated in the surface of the magnetic tape 1112 act to thereby stably fix the article 12 on the article-recept plate 103.

In general, a box for packing an article has a hexahedral shape and is formed by being assembled by using a material such as a paperboard. When it is assembled, a tape is sealed in the form of '+' on a bottom surface of the box. Accordingly, in an exemplary embodiment of the present invention, it is proposed that the magnetic field generator is also provided to have a '+' shape. This is to accomplish the greatest effect with a least amount of energy, and this is to minimize the failure of electronic products and the like by minimizing an influence of the magnetic field on the article itself.

Referring to FIG. 12, the magnetic field generator 1101 may include a first magnetic field generator 1101-1 provided to have a '+' shape. Furthermore, in an exemplary embodiment of the present invention, the magnetic field generator 1101 may further include a second magnetic field generator 1101-2 to more stably fix the '+' shaped magnetic tape 1112. The second magnetic field generator 1101-2 may be provided in a rectangular shape (or rhomboid shape) that is rotated by about 45° with respect to the '+' shape of the first magnetic field generator 1101-1. The reason why it is provided in the rotated rectangular shape is to stably fix a box even when the box is seated in a slightly rotated state without being accurately seated on the article-recept plate 103.

Furthermore, in an exemplary embodiment of the present invention, a technique to charge a drone close to an article to receive the article will be proposed.

In general, it is somewhat difficult for a drone to have a battery enough to store a large amount of energy due to the problem of weight reduction. Accordingly, when a configuration capable of charging a drone that has delivered an article is provided, the drone may more easily return to where the drone was originally located.

Figure 13:
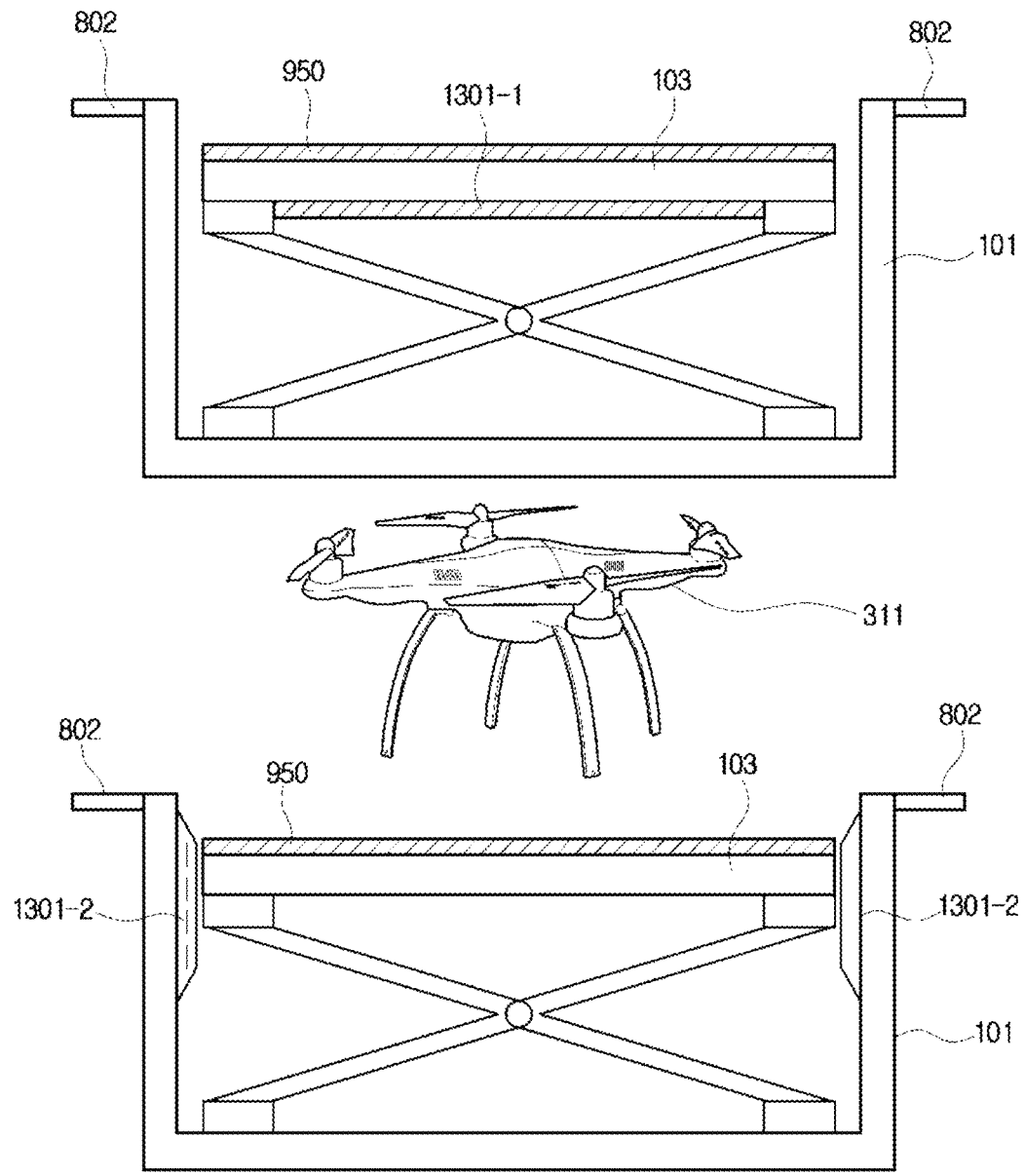
FIG. 13 illustrates a configuration of charging parts 1301-1 and 1301-2 for charging a drone according to an exemplary embodiment of the present invention.

FIG. 13 illustrates a configuration of charging parts 1301-1 and 1301-2 for charging a drone according to an exemplary embodiment of the present invention.

In the present exemplary embodiment, the first charging part 1301-1 is provided in the article-recept plate 103 to perform wireless charging. Specifically, the first charging part 1301-1 may be provided in an overlapped state with the article-recept plate 103 to enable a drone seated in the article-recept plate 103 to receive energy in a wireless charging manner and to charge the energy to an energy storage (e.g., a battery) included in the drone itself, or to transfer the energy by contacting at least two electrodes included in the drone 311.

In another exemplary embodiment of the present invention, the second charging part 1301-2 may be provided on a side surface of the article receiver 101 to charge the drone 311 landed in the article-recept plate 103. Similarly, the second charging part 1301-2 may transfer energy by contacting the electrodes included in the drone 311 or using the wireless charging method.

As described above, the auxiliary supporter 802 described with reference to FIG. 8 may be provided.

Figure 14:
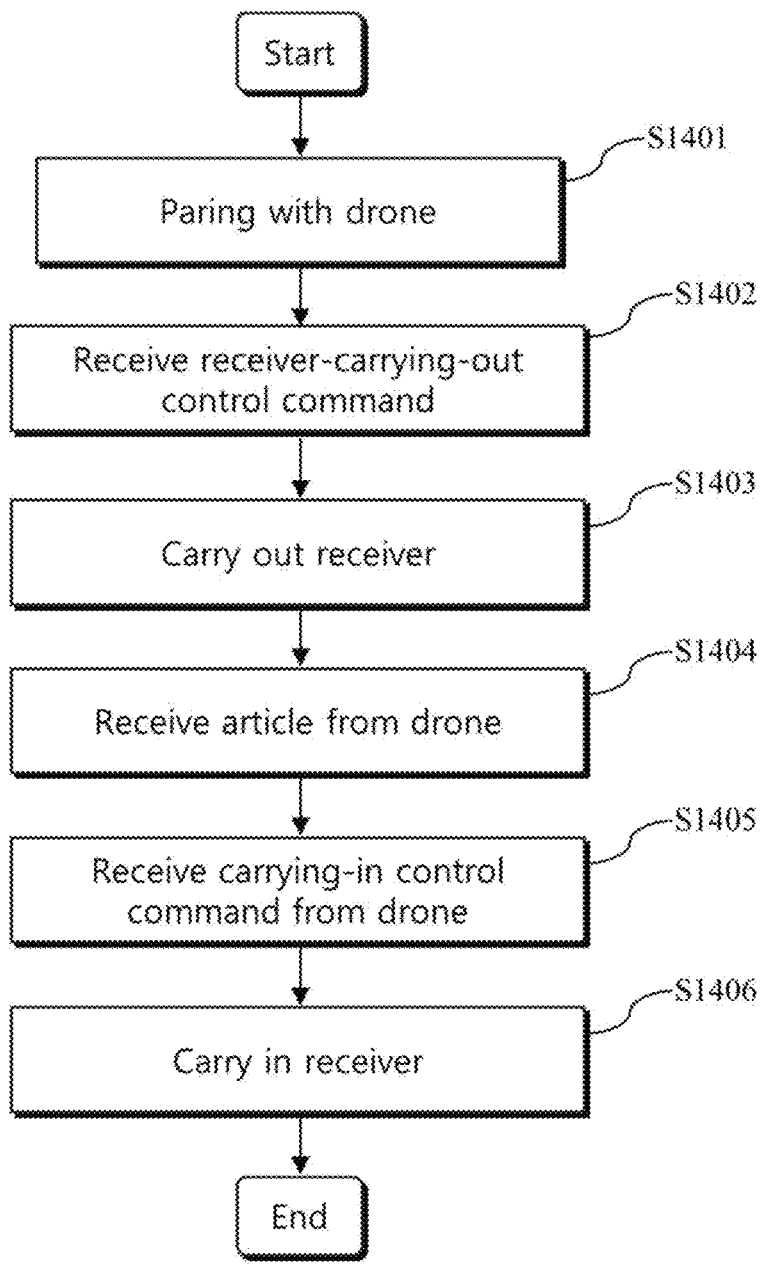
FIG. 14 illustrates a control flowchart of an unmanned article storage box 100 according to an exemplary embodiment of the present invention.

FIG. 14 illustrates a control flowchart of an unmanned article storage box 100 according to an exemplary embodiment of the present invention.

In step S1401, the controller 180 may control the wireless communication unit 110 to perform paring with the drone 311. In this case, the paring may be a state in which a data session is set to transceive data with respect to the drone 311.

In step S1402, the controller 180 receives a receiver-carrying-out control command from the drone 311. The controller 180 receiving the command may control the power unit 171 to carry out the receiver (step S1403). Next, the unmanned article storage box 100 may receive an article from the drone 311.

In step S1405, the controller 180 receives a carrying-in control command from the drone 311. The controller 180 receiving the carrying-in control command from the drone 311 may control the power unit 171 to carry in the receiver.

FIG. 15 illustrates an example in which an article storage box 100 is installed according to an exemplary embodiment of the present invention.

As illustrated therein, the unmanned article storage box 100 may be installed on a veranda bottom 321-1 (see FIG. 15(a)), or may be installed on a veranda celling 321-2 (see FIG. 15(b)). Alternatively, as illustrated in FIG. 15 (c), the unmanned article storage box 100 may be installed in the form of a mailbox outside a building (e.g., yard or park).

Figure 16:
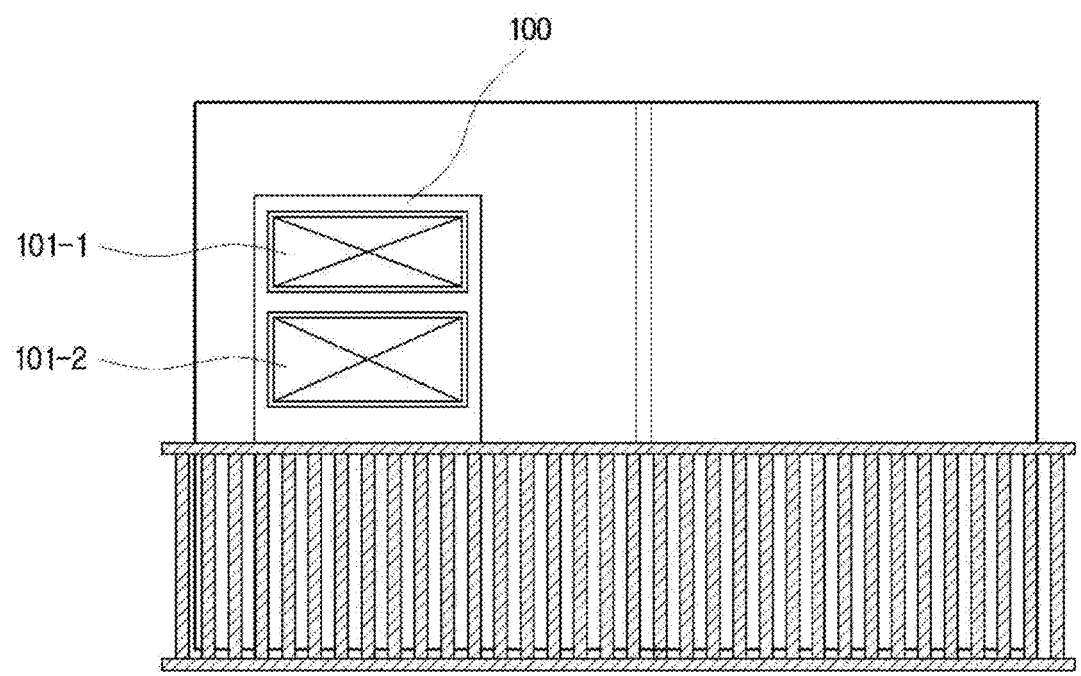
FIG. 16 is a front view illustrating an example in which an article storage box 100 is installed according to an exemplary embodiment of the present invention.

FIG. 16 is a front view illustrating an example in which an article storage box 100 is installed according to an exemplary embodiment of the present invention.

As illustrated therein, the unmanned article storage box 100 may be installed on a veranda or the like of a collective building, and when there is a railing, the article receiver 101 may be carried in or out of an upper portion of the railing.

Figure 17:
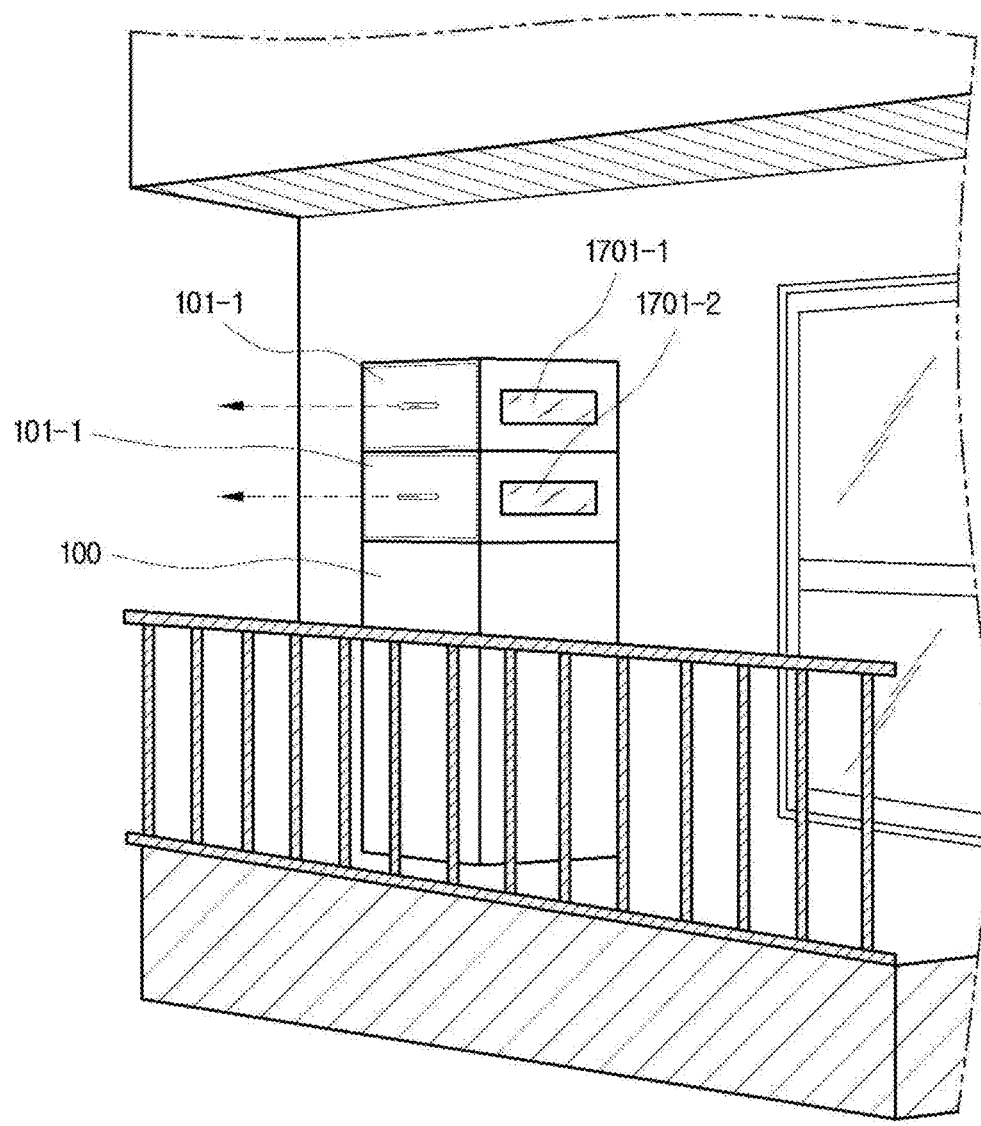
FIG. 17 illustrates a side surface of the article storage box 100 according to an exemplary embodiment of the present invention.

FIG. 17 illustrates a side surface of the article storage box 100 according to an exemplary embodiment of the present invention.

In an exemplary embodiment of the present invention, article-checking windows 1701-1 and 1701-2 may be further provided on a side surface or a rear surface of the unmanned article storage box 100, to correspond to the article receiver 101. The article-checking windows 1701-1 and 1701-2 may be formed of a transparent material or may be simply be formed as holes in order to check the inside of the unmanned article storage box 100.

Figure 18:
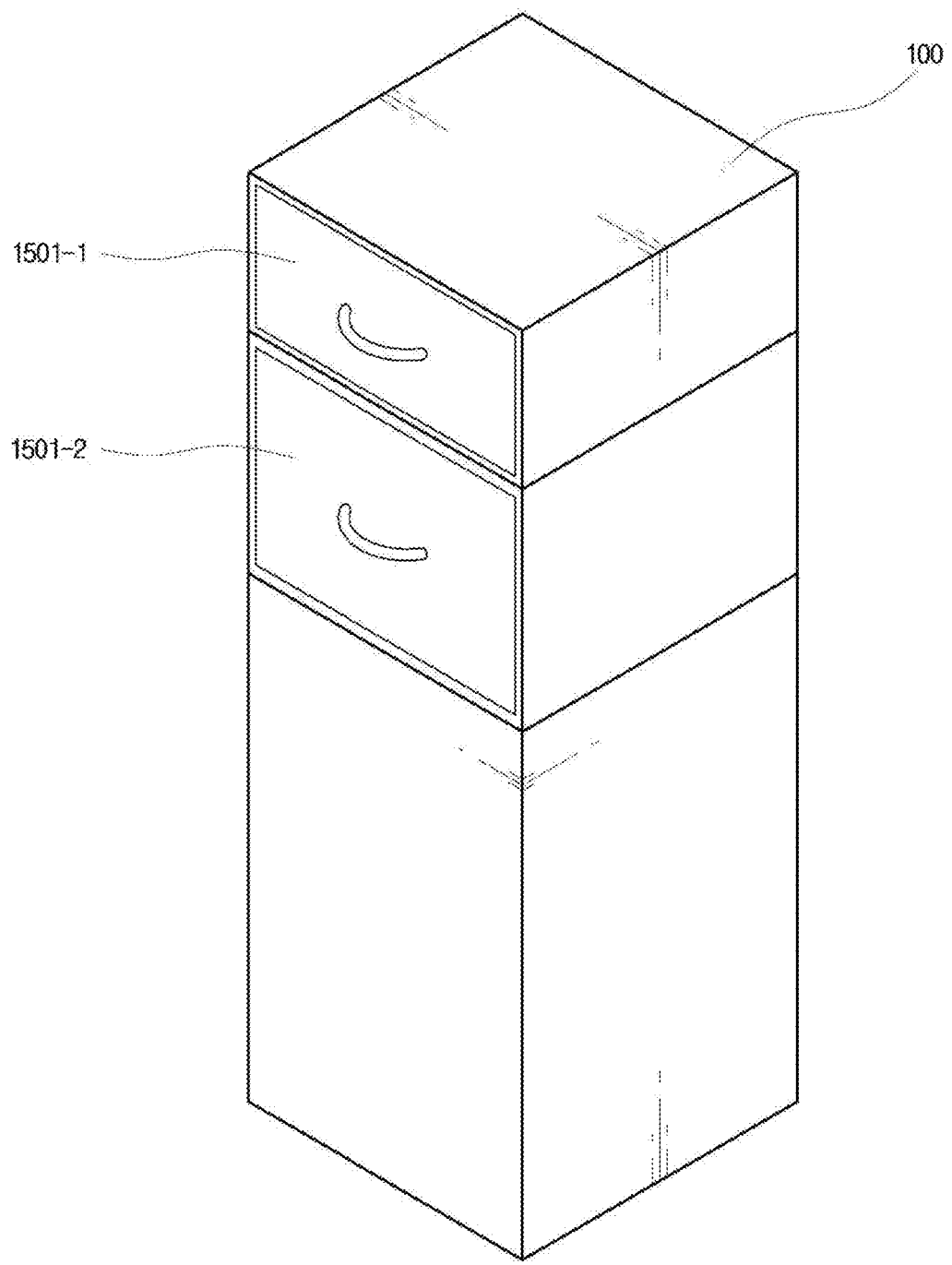
FIG. 18 illustrates a rear surface of the article storage box 100 according to an exemplary embodiment of the present invention.

FIG. 18 illustrates a rear surface of the article storage box 100 according to an exemplary embodiment of the present invention.

In the present exemplary embodiment, article openings 1501-1 and 1501-2 may be provided to take out the delivered article through the rear surface of the unmanned article storage box 100. The article openings 1501-1 and 1501-2 may be formed for each article receiver 101, or may be integrally formed. In addition, a handle may be provided to enable a user to manually open the article openings 1501-1 and 1501-2.

In the aforementioned exemplary embodiment, the case of receiving a delivery-service article by using the unmanned article storage box 100 has been described. Hereinafter, a case of sending a delivery-service article by using the unmanned article storage box 100 will be described.

Figure 19:
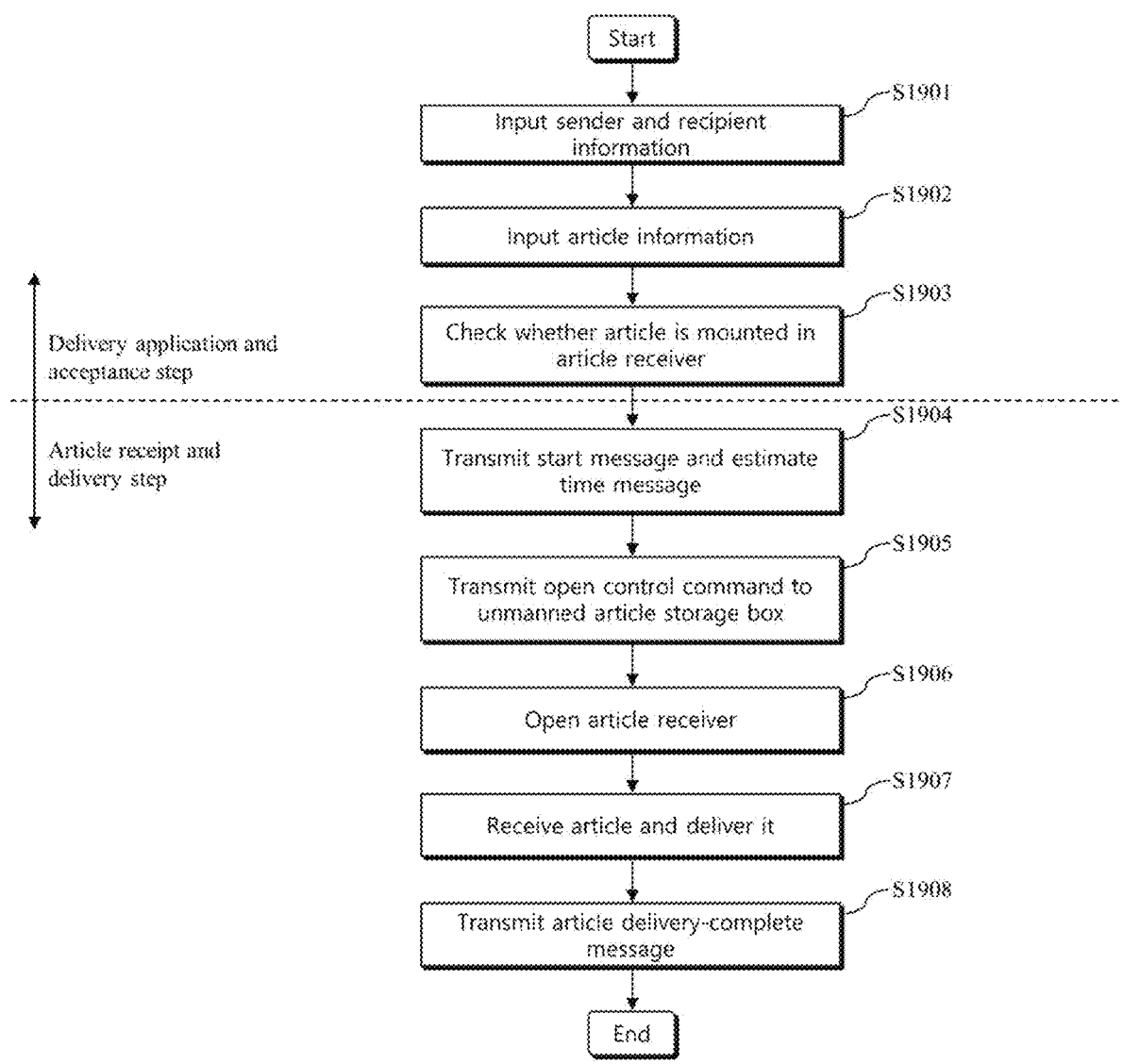
FIG. 19 illustrates an article-delivery flowchart of an unmanned article storage box 100 according to an exemplary embodiment of the present invention.
Figure 20:
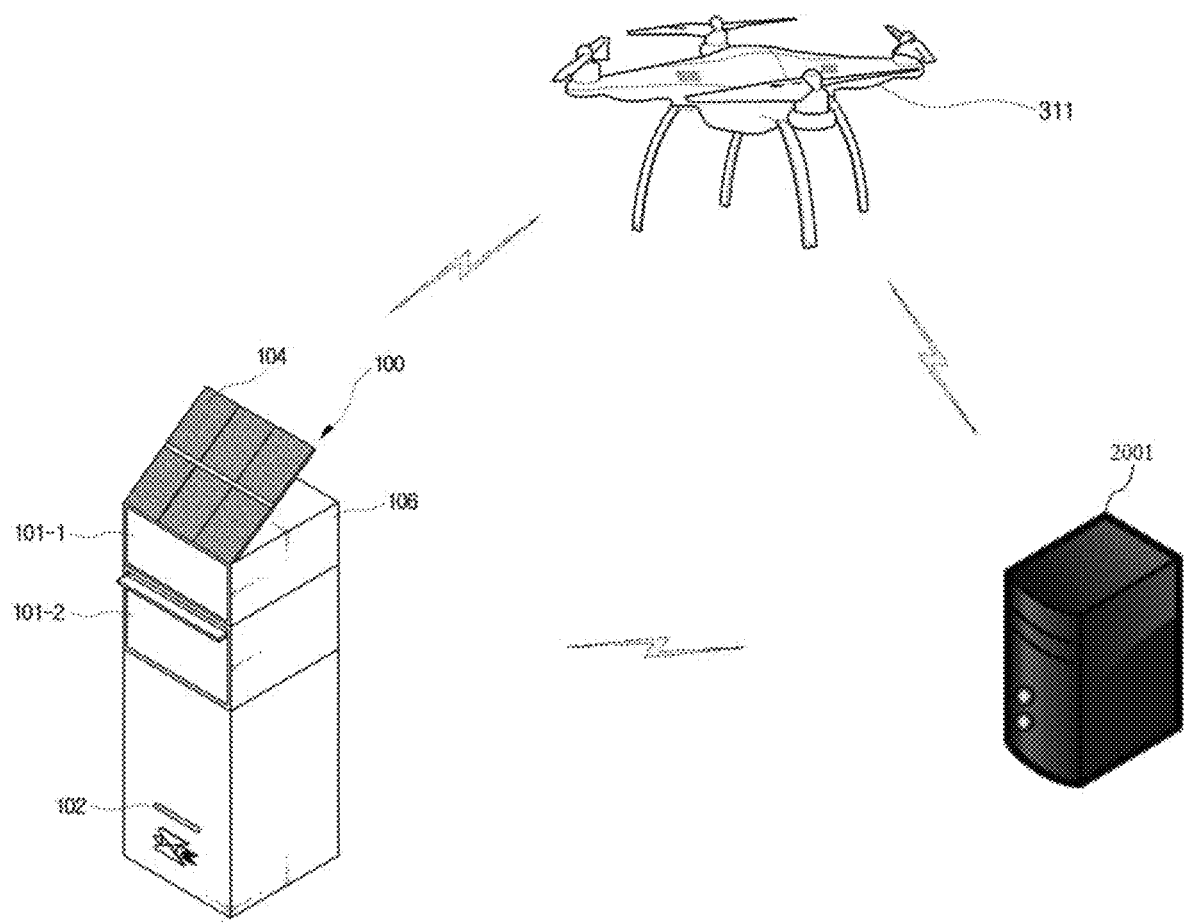
FIG. 20 is a concept view illustrating how a delivery-service article is delivered according to an exemplary embodiment of the present invention.

FIG. 19 illustrates an article-delivery flowchart of an unmanned article storage box 100 according to an exemplary embodiment of the present invention. FIG. 20 is a concept view illustrating how a delivery-service article is delivered according to an exemplary embodiment of the present invention.

As illustrated therein, data may be transceived between the unmanned article storage box 100, the drone 311, and a company server 2001 of a company that operates a delivery-service drone.

In steps S1901 to S1903, a user of the unmanned article storage box 100 applies for delivery to the company operating the delivery-service drone by using a communication terminal, and the company accept this application.

In step S1901, the user may input sender and recipient information to the drone delivery-service company (hereinafter, simply referred to as company) by using a communication terminal such as a smart phone or a PC. Herein, the sender indicates the user of the unmanned article storage box 100 himself or herself as a person who wishes to use the service.

In this case, the information to be inputted may include the sender information, the recipient information (e.g., name, phone number, address, and/or the like of the recipient). In particular, the address may indicate not only an administrative address but also a GPS address. This is because, if eventually delivered by a drone, the utilization of the GPS address is higher.

In step S1902, the user may further input information related to the article to be delivered. In this case, the information related to the article may include contents, size, weight, and/or the like.

In step S1903, whether an article is mounted in the article receiver 101 (i.e., whether an article exists in the article receiver 101) may be checked. This check of whether the article exists in the unmanned article receiver 101 may be performed by a sensor provided therein.

After the above delivery application and acceptance step, steps of receiving the article and delivering it (S1904 to S1908) may be performed.

In step S1904, the server 2001 may transmit a start message and a time message to a communication terminal of the user.

In step S1905, the drone 311 may transmit a receiver-carrying-out control command to the unmanned article storage box 100 to open the article receiver 101. Then, the unmanned article storage box 100 may open the article receiver 101 (S1906).

In step S1907, the drone 311 may receive the article from the article receiver having an open top portion and may move to a destination for article delivery. In step S1908, the server 2001 may transmit an article delivery-complete message to the communication terminal, after the movement is completely performed and the article is delivered to the destination.

In an exemplary embodiment of the present invention, a signal for reporting whether the article has arrived in the unmanned article storage box 100 may be outputted. This exemplary embodiment will be described with reference to FIG. 21.

Figure 21:
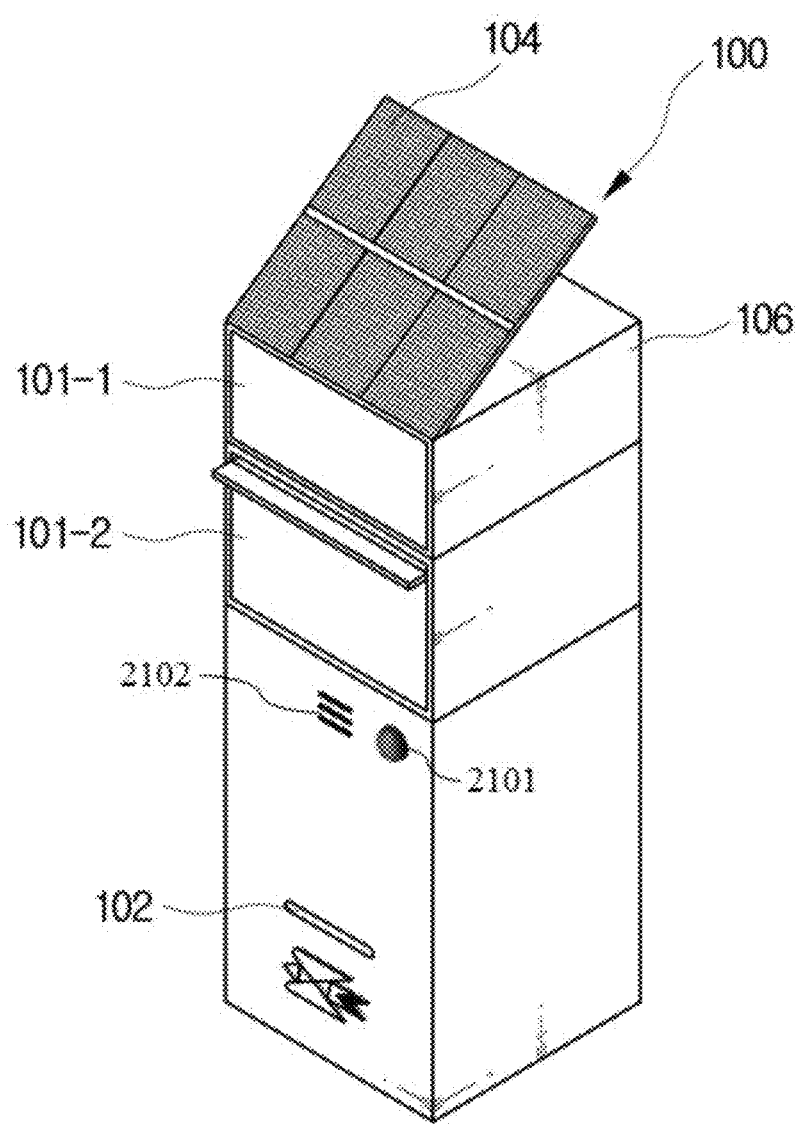
FIG. 21 illustrates an output section for reporting that an article arrives at the unmanned article storage box 100.

FIG. 21 illustrates an output section for reporting that an article arrives at the unmanned article storage box 100. The output section may include a sound output section 2102 and a light output section 2101.

The light output section 2101 may output different colors depending on whether the article has arrived like a traffic light, and the sound output section 2102 may notify the user of article arrival by outputting a predetermined notification sound when the article arrives.

Furthermore, in an exemplary embodiment of the present invention, it is proposed that article receivers 101-1 and 101-2 are used for receiving articles instead of being used for storing the articles and a separate storage device 2201 for storing the articles is provided. This exemplary embodiment will be described with reference to FIG. 22.

Figure 22:
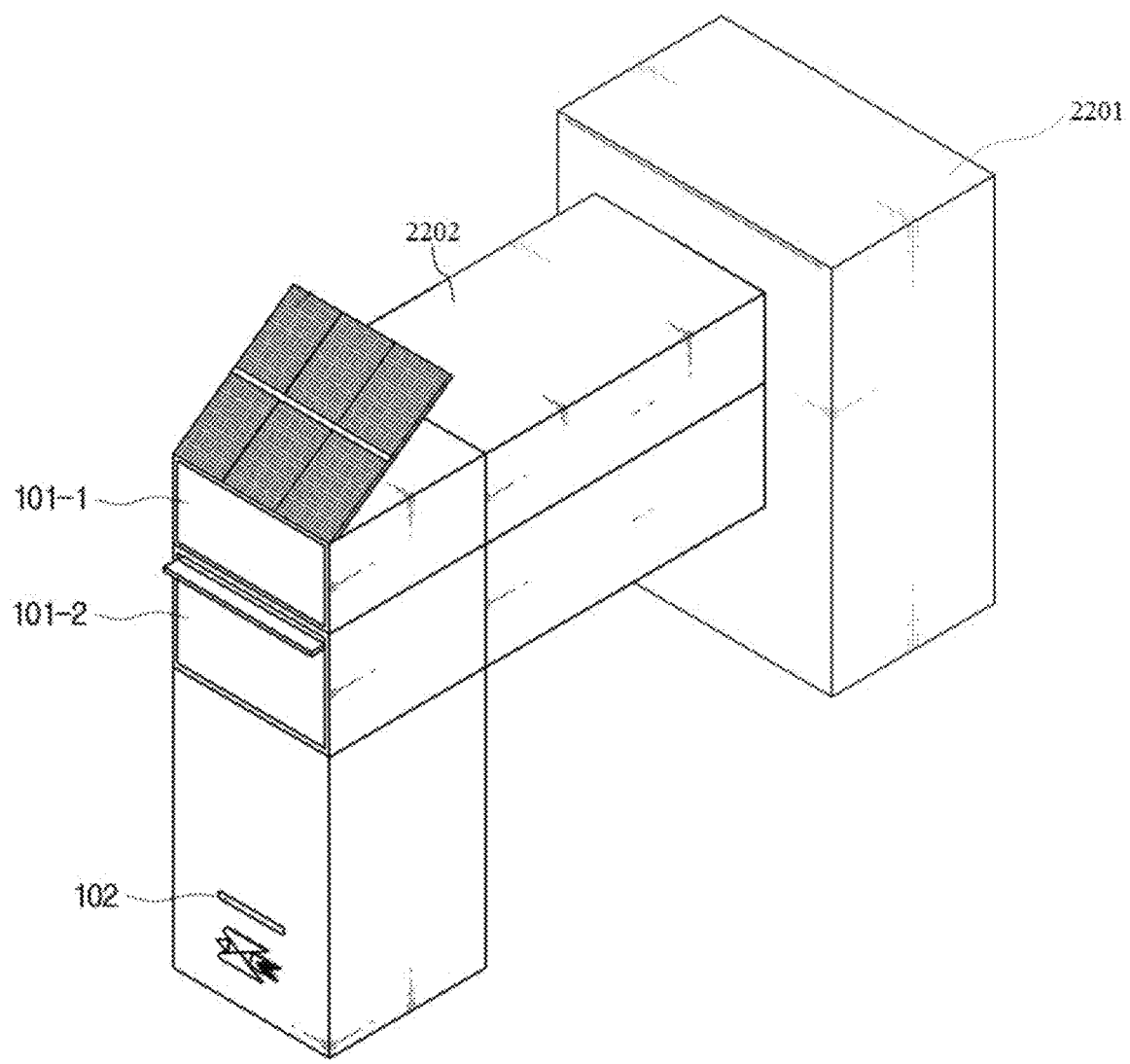
FIG. 22 illustrates a storage device 2201 according to an exemplary embodiment of the present invention.

FIG. 22 illustrates a storage device 2201 according to an exemplary embodiment of the present invention.

When a large number of people in a building or a place for handling many deliver-service articles commonly use or people in a certain place or region use together receivers, it may be difficult to handle delivery-service articles with two or more article receivers 101-1 and 101-2. Accordingly, in the present exemplary embodiment, a separate storage device 2201 is provided to move the article to the storage device 2201 through the article receiver 101 and to store it.

As illustrated therein, when the article is received in the article receivers 101-1 and 101-2, the controller 180 may control the power unit 171 to move the article to the storage device 2201 along a passage 2202.

The storage device 2201 may include a plurality of storage boxes, and when a user inputs a password known to the user, the storage device 2201 may open a corresponding storage box and may enable the user to receive the stored article.

Furthermore, a configuration for adjusting a temperature inside the article receiver 101 will be proposed.

Figure 23:
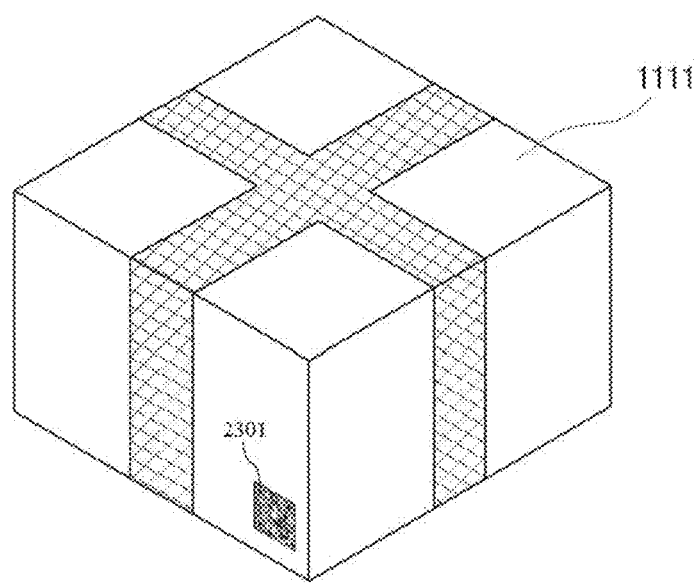
FIG. 23 is a view for adjusting a figuration for adjusting a temperature in an article receiver 101 according to an exemplary embodiment of the present invention.

FIG. 23 is a view for adjusting a figuration for adjusting a temperature in an article receiver 101 according to an exemplary embodiment of the present invention.

There is a large number of food deliveries and market deliveries as well as regular postal or delivery-service articles. Particularly, with more and more families living along, the delivery of food such as chicken, pizza, pork legs and the like is increased. Such food articles may require warming and cooling for a certain period of time. Specifically, the delivery of liquor, beverage, vegetable, and flower requires a cold function, and the delivery of frozen desserts and frozen meat requires a freezing function.

For this purpose, in an exemplary embodiment of the present invention, as illustrated in FIG. 23, it is proposed to display an appropriate temperature on an identification code (e.g., barcode, QR code, etc.) outside in a delivery article 1111. Specifically, when information related to the appropriate temperature is included in the identification code corresponding information is read out through a sensing unit (e.g., a camera for photographing the identification code) disposed in the article receiver 101, the controller 180 may control the temperature adjuster to perform cooling and warming according to the appropriate temperature.

The temperature adjuster may perform a cooling and warming function for increasing or decreasing a temperature inside the article receiver 101 depending on the control of the controller 180.

(1) Function of Relay Station for Delivery-Service Articles

The unmanned article storage box 100 may serve as a stopover that temporarily stores an article or may provide a relay function for charging an insufficient battery or for replenishing fuel, when long-distance flight is required for a drone that delivers an article but the battery or fuel is insufficient for the long-distance flight.

(2) Function of Providing Shelter when Drone Suddenly Fails or Run Out of Fuel

The unmanned article storage box 100 may provide a function of providing an urgent shelter to a drone that delivers an article when the drone flying near the unmanned article storage box 100 are unable to fly suddenly due to lack of battery or fuel, or suddenly fails.

(3) Function of Receiving or Delivering Emergency Articles

It is possible to provide a function of emergently receiving or delivering fire extinguishing equipment, medical equipment, medicines and foodstuffs which are necessary in an emergent situation in a building or place where the storage box is disposed.

Although explaining the unmanned article storage box according to the present invention which will be described by way of at least one exemplary embodiment, whereby the technical concept and the construction and operation of the present invention as not to be limited, to not to be limited/restricted by the description in the range of the technical concept of the present invention to with reference to the drawings or figures. The concepts and embodiments of the invention presented herein may be used by those of ordinary skill in the art as a basis for modifying or designing a different structure to carry out the same purposes of this invention, and the present invention generally modified or changed equivalent structures by those having knowledge in the art belonging to the as being bound by the technical scope of the present invention described in the claims, the spirit and scope of the invention described in the claims various changes within the limits that do not depart, may be substituted and changed.

What is claimed is:

1. An unmanned article storage box (100) for delivering an article to a drone or receiving an article from a drone to store the article, the unmanned article storage box comprising:
   a box main body (106) configured to form an accommodating space for storing the article therein;
   an article receiver (101) configured to slidingly be carried in and out from the box main body (106);
   a sliding unit (105) configured to slidingly move the article receiver (101) by having a first end that is fastened to the article receiver (101) and a second end that is fastened to an inside of the box main body (106);
   a power unit (171) configured to transfer a power to enable the article receiver (101) to move along the sliding unit (105); and
   a controller (180) configured to control the power unit (171),
   wherein the article receiver includes an article-recept plate that is vertically moved up and down on the sliding unit (105), wherein the article-recept plate (103) includes a wireless charger for wirelessly transmitting a power to the drone safely landed on the article-recept plate.

2. The unmanned article storage box of claim 1, further comprising a wireless communication unit (110) configured to transmit and receive data to and from the drone.

3. The unmanned article storage box of claim 2, wherein the controller controls the power unit to enable the article receiver to be carried out along the sliding unit (105) when a receiver-carrying-out control command is received from the drone through the wireless communication unit.

4. The unmanned article storage box of claim 3, wherein the controller controls the power unit to enable the article receiver to be carried in along the sliding unit (105) when a receiver-carrying-in control command is received from the drone through the wireless communication unit after the drone puts the article in the article receiver.

5. The unmanned article storage box of claim 2, wherein:
the article receiver (101) stores a target article to be delivered, and
the controller (180) controls the article receiver (101) to be opened to allow the drone to receive the target article when the drone approaches to a vicinity and transmits an article-recept message to a user when the drone receives the target article.

6. The unmanned article storage box of claim 5, wherein the controller (180) transmits an article-arrival complete message to the user when the drone receiving the article arrives at a destination.

7. The unmanned article storage box of claim 1, wherein the article receiver includes a windshield panel provided to surround the article receiver (101).

8. The unmanned article storage box of claim 1, further comprising an impact-absorption pad provided at an upper end of the article-recept plate.

9. The unmanned article storage box of claim 1, wherein the article-recept plate (103) includes a drain line formed therein in a predetermined pattern to be drained by a predetermined depth.

10. The unmanned article storage box of claim 9, wherein a plurality of drain holes are formed on the drain line in the article-recept plate (103).

11. The unmanned article storage box of claim 1, wherein the article-recept plate (103) includes a field generator for generating a magnetic field at a predetermined region on the article-recept plate (103).

12. The unmanned article storage box of claim 1, wherein the wireless charger is vertically movable up and down together with the article-recept plate (103).

13. The unmanned article storage box of claim 1, further comprising:

a solar panel (104) disposed at an upper portion of the unmanned article storage box (100) to be inclined at a predetermined angle; and
an energy storage unit configured to store the power generated by the solar panel (104).

14. The unmanned article storage box of claim 1, further comprising an output section configured to inform the user that the article is stored,
wherein the controller (180) controls the output section to report that the article is stored when the article is stored in the article receiver (101).

15. The unmanned article storage box of claim 14, wherein the output section is a sound output section for outputting an alarming sound or a light output section for outputting light.

16. The unmanned article storage box of claim 1, further comprising a storage device (2201),
wherein the controller (180) moves the article to the storage device (2201) when the article arrives at the article receiver (101).

17. An article delivering system comprising:
a drone (311) configured to receive an article to be delivered and to move the article to a designed place;
an unmanned article storage box (100) configured to receive the article from the drone (311);
a server (2001) configured to provide an article delivery service; and
a communication terminal configured to perform delivery application acceptance to the server (2001),
wherein, when a delivery application is accepted to the server (2001), through the communication terminal,
the server (2001) transmits a start message and an estimated time message to the communication terminal,
the drone (311) moves to the unmanned article storage box (100) and transmits an open-control command requesting to open an article receiver (101),
the unmanned article storage box (100) receiving the open-control command opens the article receiver (101),
the drone (311) receiving the article from the article receiver (101) delivers the article to the designed place, and
the server (2001) transmits a delivery-complete message to the communication terminal when the article is completely delivered,
wherein the article receiver includes an article-recept plate that is vertically moved up and down on a sliding unit (105),
wherein the article-recept plate (103) includes a wireless charger for wirelessly transmitting a power to the drone safely landed on the article-recept plate.

* * * * *